Aug. 4, 1959 G. C. FOSTER 2,898,407

ELECTRONIC TELEPHONE SYSTEM

Filed June 5, 1957 11 Sheets-Sheet 1

Aug. 4, 1959 G. C. FOSTER 2,898,407

ELECTRONIC TELEPHONE SYSTEM

Filed June 5, 1957 11 Sheets-Sheet 2

Aug. 4, 1959 G. C. FOSTER 2,898,407

ELECTRONIC TELEPHONE SYSTEM

Filed June 5, 1957 11 Sheets-Sheet 3

Aug. 4, 1959 G. C. FOSTER 2,898,407

ELECTRONIC TELEPHONE SYSTEM

Filed June 5, 1957 11 Sheets-Sheet 5

ELECTRONIC TELEPHONE SYSTEM

Filed June 5, 1957 11 Sheets-Sheet 7

Aug. 4, 1959 G. C. FOSTER 2,898,407

ELECTRONIC TELEPHONE SYSTEM

Filed June 5, 1957 11 Sheets-Sheet 10

Aug. 4, 1959 G. C. FOSTER 2,898,407

ELECTRONIC TELEPHONE SYSTEM

Filed June 5, 1957

11 Sheets-Sheet 11

INVENTOR.
GILBERT C. FOSTER

BY F. W. Hanson

AGENT

2,898,407

ELECTRONIC TELEPHONE SYSTEM

Gilbert C. Foster, Rochester, N.Y., assignor to General Dynamics Corporation, Rochester, N.Y., a corporation of Delaware Application June 5, 1957, Serial No. 663,802

15 Claims. (Cl. 179—18)

This invention relates in general to electronic switching systems and, more particularly, to electronic switching automatic telephone systems.

Many types of automatic switching systems have been developed for connecting the lines of telephone, telegraph, and other communication systems together for the purpose of transmitting signals between the lines. Most of the switching systems developed for this purpose have utilized electromechanical devices such as relays and stepping switches. In recent years, electronic switching systems have been proposed to overcome the inherent limitations of slowness, physical size, and maintenance problems of the electromechanical devices.

Most of the proposed electronic telephone systems are of the time sharing or multiplexing type and require considerable equipment common to the lines of the system for establishing the time positions individual to the lines. Although the multiplexing type of system may be practical for rather large offices, it is not economical to provide the necessary common equipment for small P.B.X. or other offices.

Accordingly, it is the general object of this invention to provide a new and improved switching system.

It is a more particular object of this invention to provide a new and improved electronic direct switching telephone system.

In the electronic direct switching automatic telephone system herein disclosed, calling and called bilateral semiconductive devices, which may be junction transistors, are provided for each line and each link of the system. Each link of the system comprises a line finder and a connector which are controlled to render conductive the bilateral devices associated with the calling and called lines, respectively.

Each semi-conductive device includes first and second electrodes and a control electrode. Each line circuit is individually connected to the first electrode of a device controlled by each line finder and the first electrode of a device controlled by each connector. The second electrodes of all of the devices controlled by each line finder are connected in multiple to a first conductor which is connected to the connector of that link and the second electrodes of all of the devices controlled by each connector are connected in multiple to a single conductor which extends to the connector. Tens and units conductors extending from the line finder are connected in unique combinations to the control electrodes of the devices controlled by that line finder and to the line circuits corresponding to each of the devices. The control electrodes of all of the devices controlled by the line finder are also connected to a switch-through conductor extending to that line finder. Similarly, tens and units conductors extending from the connector are connected in unique combinations to the control electrodes of the devices controlled by that connector.

The line finder in the link assigned for use by the link allotter provided in the system searches for a calling line by applying potential to the various unique combinations of tens and units conductors in turn. Each line circuit includes a finder input gate which is operative only when the line circuit is in a calling condition and which is responsive to the application of potential to its associated unique combination of tens and units conductors to transmit a control signal to the line finder. Upon the receipt of the control signal, switch-through means in the line finder operates to terminate the searching operation of the line finder and to apply a potential to the finder switch-through conductor. The calling line device, which is identified as such by having potential applied to both its tens and units conductors, is rendered conductive when potential is applied to the finder switch-through conductor and the calling line is connected to the first conductor.

Dial impulses received over the calling line are coupled to the first conductor and a digit register in the connector registers the number of the desired called line. Potential is then applied by the connector to the tens and units conductors identifying the called line to render conductive the device corresponding to the called line and connect the called line to the second conductor. A busy test of the called line is then made over the second conductor. If the called line is busy, busy tone is applied to the first conductor. If the called line is idle, the connector functions to operate a link switch which interconnects the first and second conductors. Thus, the calling line is connected for conversational purposes to the called line through the calling line device controlled by the line finder and through the called line device controlled by the connector.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise twelve figures on eleven sheets.

Figs. 1 and 2, which should be arranged with Fig. 2 to the right of Fig. 1, show the telephone system in block diagram form.

Figs. 3–11, inclusive, when arranged in accordance with Fig. 12, show the circuit details of the circuits shown in block form in Figs. 1 and 2.

GENERAL DESCRIPTION

Referring to Figs. 1 and 2 of the drawings, it can be seen that two line circuits, namely, line circuits 11 and 12, and two links have been shown. Link 1 is identical to link 2 and comprises finder matrix 13, link switch 14, connector matrix 15, and finder-connector 16. It is to be understood, of course, that in practice many more line circuits identical to line circuits 11 and 12 would be included in the telephone system and the number of links provided to serve the lines would be dictated by traffic conditions. Normally for a twenty line system, four or more links are required and, for a one hundred line system, between ten and twelve links are required to handle the traffic. The illustrated telephone system also includes common equipment comprising link allotter 17, register drive pulse generator 18, tone and ringing pulse generator 19, line pulse amplifier 20, and ringing generator 21.

Each of the line circuits terminates in a cross-point of the finder and connector matrices of each link. It can be seen that line circuit 11 is connected by conductor L11 to finder matrix 13 and connector matrix 15 of link 1 and to the finder and connector matrices of link 2. Similarly, line circuit 12 is connected by conductor L12 to the finder and connector matrices of both the first and second links. Each cross-point of finder matrix 13 comprises a bilateral transistor switch having first and second emitter-collector electrodes and a control electrode. A first emitter-collector electrode of each transistor is individually connected to the input serving one of the lines of the system. For example, conductor L11 is connected to the first emitter-collector electrode of the transistor serving line circuit 11. The second electrodes of all of the cross-point transistors are connected to the single output conductor LSW, which extends to finder-connector 16. The control electrode of each cross-point transistor is connected to appropriate tens and units conductors which identify the line circuit associated with that transistor and to a finder switch-through conductor FSW1′ which extends to the line finder. Thus, the control electrode of the cross-point transistor serving line circuit 11 is connected to finder tens one conductor FT1 and to finder units one conductor FU1, and the transistor is designed to be rendered conductive only when potential is applied to said conductors simultaneously and only after the proper potential is applied to conductor FSW1′. Potentials are applied to the FT1–FT5 and FU1–FU4 conductors in sequential order by the finder portion of finder-connector 16, as will be described more fully hereinafter. The connector matrix 15 is identical to the finder matrix with each cross-point comprising a bilateral transistor switch having a first emitter-collector electrode connected to an individual line circuit and its other emitter-collector electrode connected to the single input conductor LSW′, which extends to finder-connector 16, and its control electrode connected to the appropriate connector tens and units conductors.

The link allotter 17 functions to assign the links of the system for use in turn. Each link is assigned only for the time period required for it to associate itself with a calling line. The selection of link 1 is signified by the application of suitable potentials to conductors AL1 and AL1′ by the allotter and, when link 1 has seized a calling line, a signal returned over conductor FSW1 to link allotter 17 serves to advance the allotter to select link 2, as signified by the application of suitable potentials to conductors AL2 and AL2′. The finder portion of each finder-connector comprises a units register and a tens register. When the link is assigned for use, the potential appearing on conductor AL1′ is utilized to unblock a gate which permits register drive pulses appearing on conductor RDP′ from register drive pulse generator 18 to advance to units register step by step for the purpose of applying operating potential to conductors FU1–FU4 in successive order. The tens register is stepped from the last stage of the units register and the tens register stages serve to apply potential to conductors FT1–FT5 in successive order. Thus, it can be seen that the units conductors are each energized in turn for each setting of the tens register. The tens and units conductors corresponding to each line circuit, in addition to controlling the operation of the cross-point transistor, are gated together in finder matrix 13 and, when the finder registers are in a setting corresponding to that line, a first control signal is transmitted to that line. That is, when conductors FU1 and FT1 are energized simultaneously, a first control signal is applied to conductor 1FPA11, which extends to line circuit 11, and when conductors FU2 and FT1 are energized simultaneously, a first control signal is applied to conductor 1FPA12 which extends to line circuit 12. The first control signal transmitted to each line circuit in turn, regardless of the idle or busy condition of each line circuit, has no effect in the line circuit unless the line circuit is in a calling condition.

It is believed that the general operation of the system can now best be described by tracing a call through the system. For this purpose, assume that the subscriber at STA11 initiates a call, that link 1 has been assigned for use by allotter 17, and that the finder registers of finder-connector 16 are advancing step by step searching for a calling line. When the finder registers have advanced to the position wherein conductors FU1 and FT1 are energized simultaneously, a first control signal is applied to conductor 1FPA11 in finder matrix 13 and since line circuit 11 is assumed to be in a calling condition, a second control signal is applied to conductor LP by line circuit 11. The second control signal, which is in the form of a pulse, is amplified by line pulse amplifier 20 and the resulting amplified pulse is transmitted over conductor LPA to the finder-connectors. In each finder-connector, the pulse appearing on conductor LPA is gated with an allotter control potential, such as AL1 for link 1. An output is realized only from the gate in the assigned link and is utilized to operate a finder switch-through circuit in that link which, in turn, blocks further stepping of the finder register circuits, applies a potential to conductor FSW1 to advance the allotter to the next link, and applies a potential to conductor FSW1′ which, in conjunction with the potentials applied to FT1 and FU1, renders conductive the transistor switch corresponding to line circuit 11 in finder matrix 13. Thus, the finder registers of link 1 remain in the settings which control the application of potentials to conductors FU1 and FT1 and thus control the cross-point transistor corresponding to line circuit 11 in finder matrix 13 to connect conductor L11 to conductor LSW. The operation of the finder switch-through circuit also serves to control a dial tone gate in finder-connector 16 which then applies dial tone to conductor LSW to inform the calling party that the circuits are in readiness to receive dial impulses.

Dial impulses received from calling line circuit 11 over conductor LSW are utilized in the connector portion of finder-connector 16 to position tens and units digit registers. At the completion of the second digit, the connector tens and connector units conductors corresponding to the called line are energized by the operated tens and units register stages, respectively, to actuate the cross-point bilateral transistor associated with the called line in connector matrix 15. If it be assumed that line circuit 12 is the desired called line, potential is applied to conductors CT1 and CU2 to operate the cross-point bilateral switch associated with line circuit 12 and thus connect input conductor LSW′ to conductor L12 which extends to line circuit 12. In addition to rendering the cross-point transistor conductive, the potentials on conductors CT1 and CU2 are gated together in connector matrix 15 and a resulting control potential is applied to conductor 1FLB12, which extends to line circuit 12, for the purpose of marking line circuit 12 busy to the finders of the system. In other words, the potential applied to conductor 1FLB12 prevents line circuit 12 from transmitting a pulse to conductor LP when a subscriber at STA12 answers the call now being described.

A busy test is now performed over conductor LSW′ and conductor L12 by circuit 16. If STA12 is in an off condition or if line circuit 12 has been seized by another link and STA12 is being rung, a first potential appears on conductor L12. If STA12 is in an on-hook condition and line circuit 12 has not been seized by another link, a second potential appears on conductor L12. If the line tests busy, busy tone is applied to conductor LSW to inform the calling party of that condition. If the line is idle, circuit 16 functions to operate link switch 14 over conductor LSWC and the operated link switch 14 connects conductor LSW to conductor LSW′. The potential appearing on conductors L11 and LSW is thus applied to conductors LSW′ and L12 and serves to mark line circuit 12 as busy to the other connectors of the system. Also, if the called line is idle, the potential transmitted over conductor 1FLB12 from connector matrix 15 enables a gate in line circuit 12 which allows ringing control pulses applied to conductor RCC by circuit 19 to actuate a ringing control circuit in line circuit 12 for the purpose of applying ringing frequency from generator 21 to the line. When the call is answered at STA12, ringing is tripped in line circuit 12 by blocking the last-mentioned gate. STA11 and STA12 are now interconnected for conversational purposes over conductor L11 through the cross-point transistor associated with line circuit 11 in finder matrix 13, conductor LSW, a bilateral transistor switch in link switch 14, conductor LSW', through the cross-point transistor associated with line circuit 12 in connector matrix 15, and over conductor L12.

DETAILED DESCRIPTION

In the detailed description which follows, the transistor types actually used in the tested model of the system are specifically identified. All of the transistors used in the system are of the junction type and all of the transistors, except the bilateral transistors utilized in the line circuits, the link matrices, and in the link switch, have been given the conventional notation of an arrow superimposed on the emitter electrode. The bilateral transistors have been given a notation of an arrow superimposed on both the so-called emitter and collector electrodes. This notation signifies that these transistors are bilateral in operation and have good amplification with either junction used as the emitter. Also in the conventional manner, the direction of the arrow designates whether the particular transistor is of the NPN or PNP junction type. A NPN junction transistor is identified by an arrow which points away from the base electrode, while a PNP junction transistor is identified by an arrow which points toward the base electrode.

*Line circuit 11*

Figure 1:
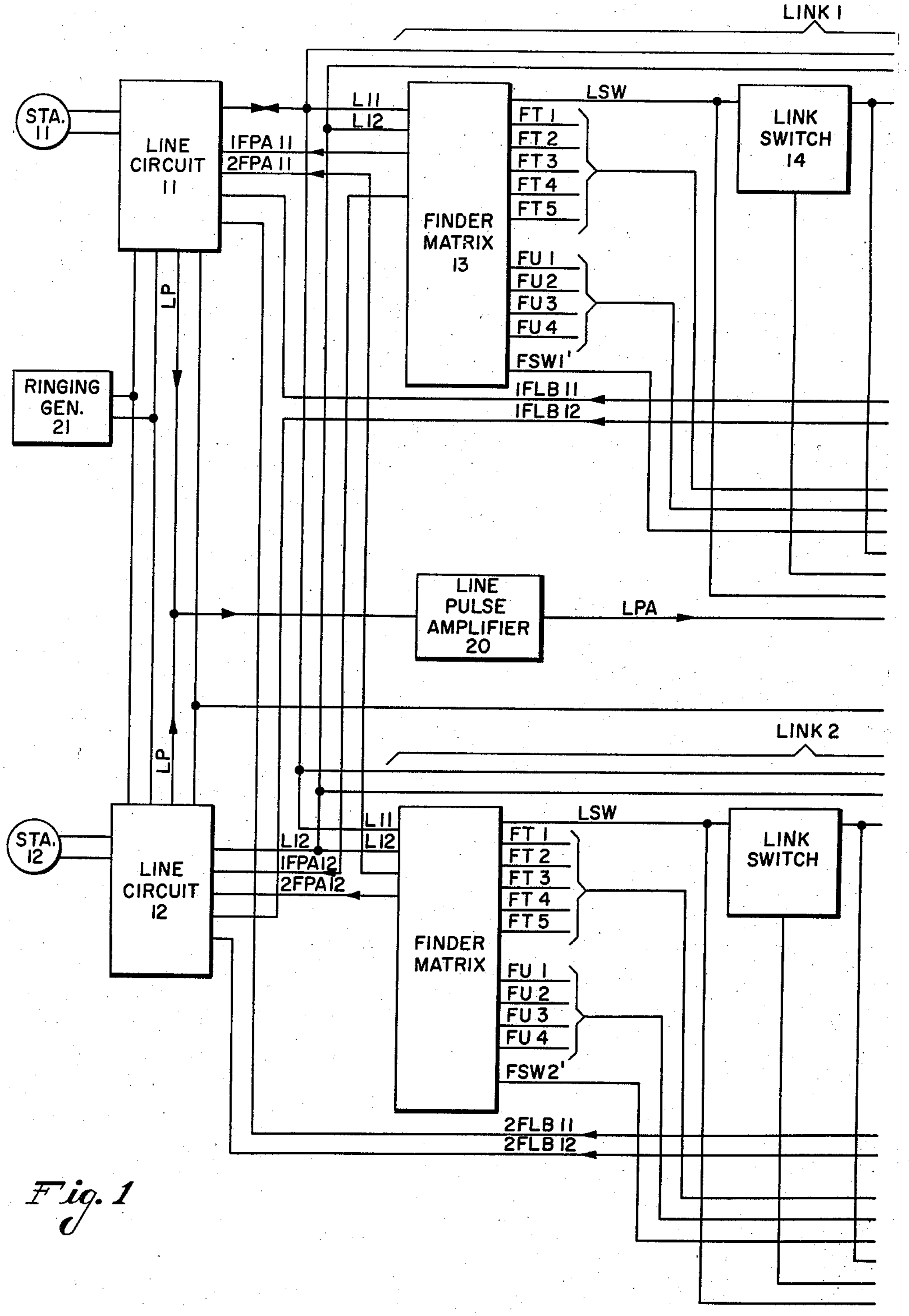
Figure 2:
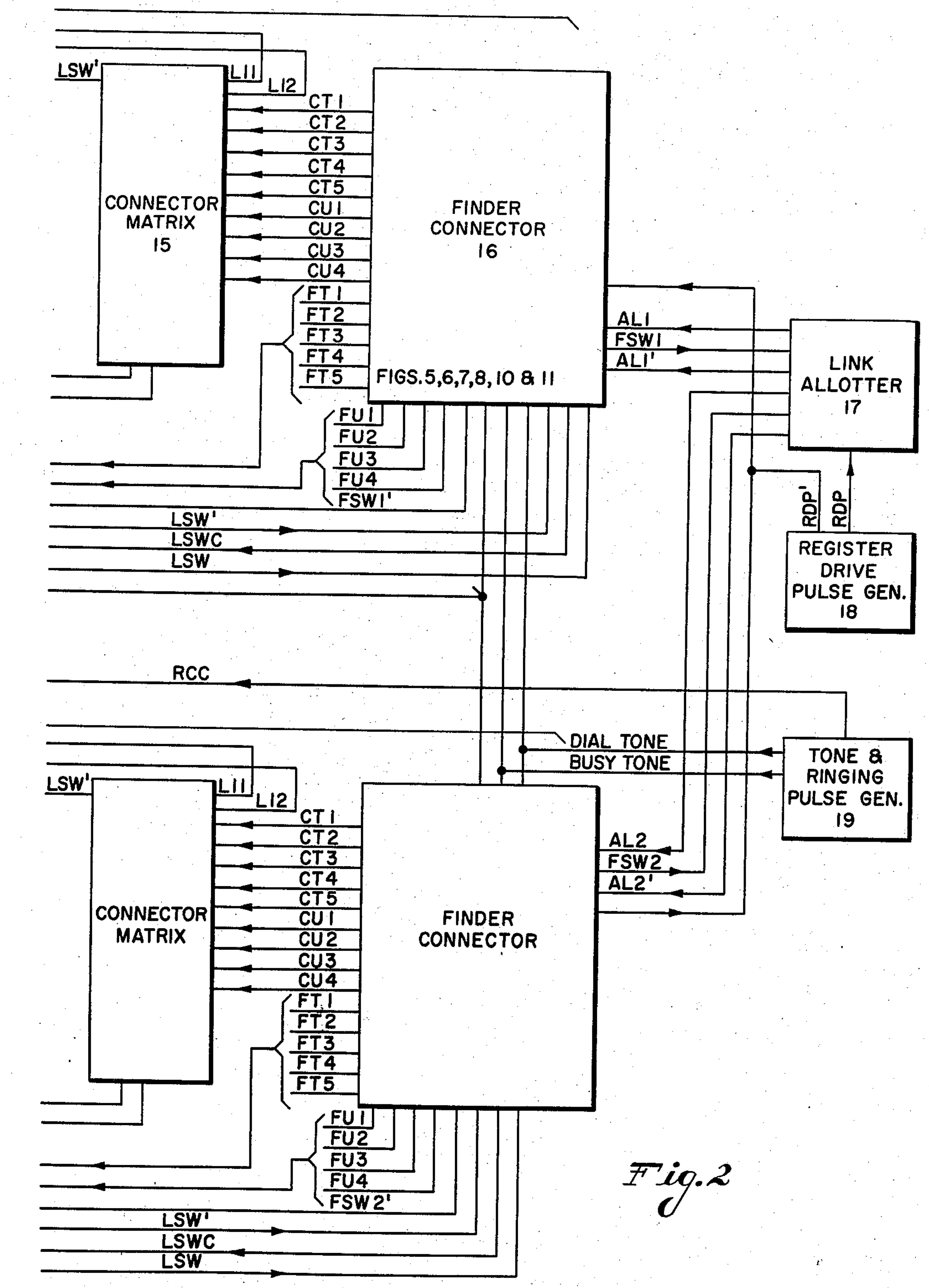
Figure 3:
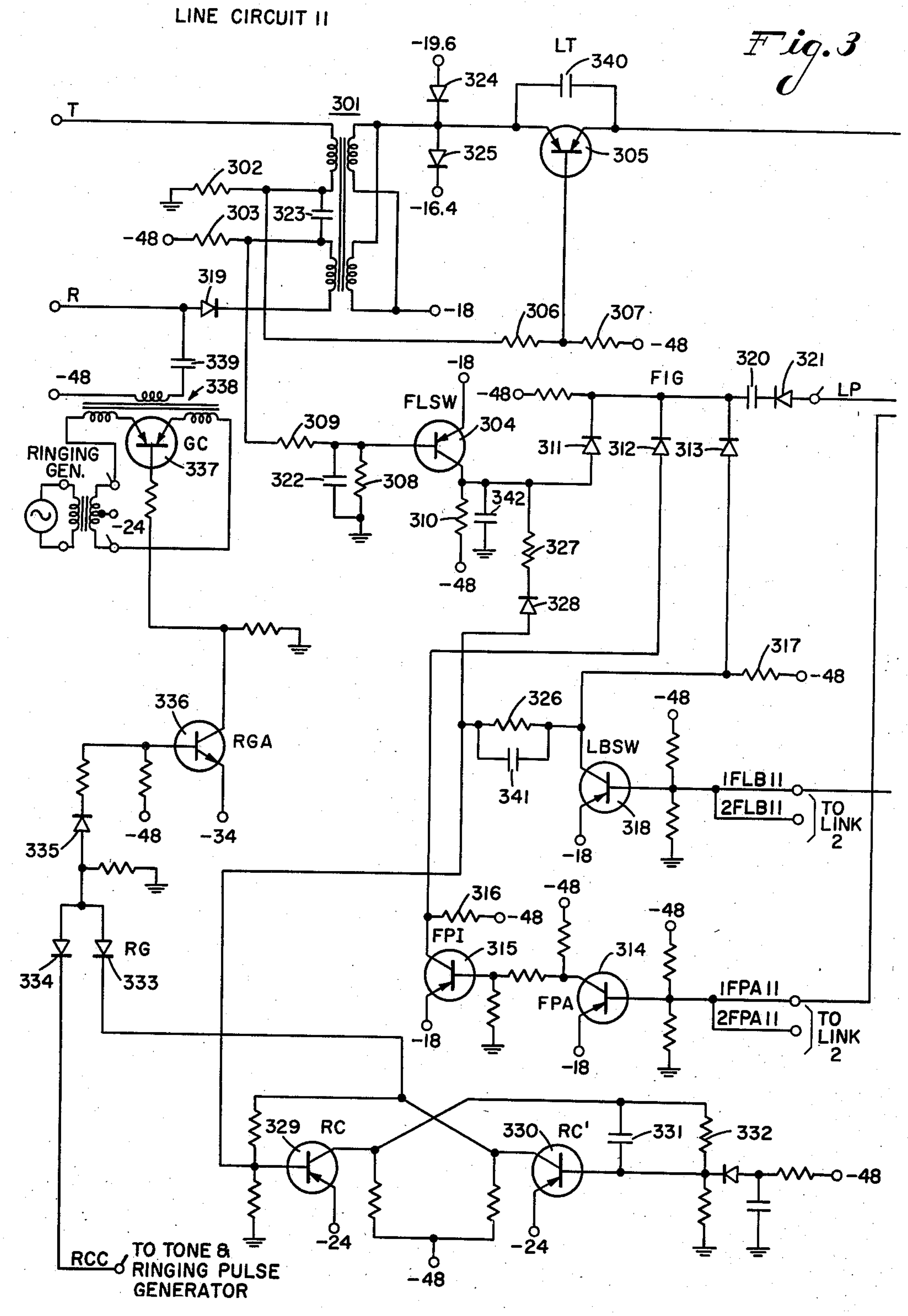

The tip and ring conductors T and R, respectively, extending from the subscriber station associated with line circuit 11, which is shown in detail in Fig. 3, terminate on the upper and lower terminals of the primary windings of line circuit transformer 301. Battery feed is supplied to the station from ground through supervisory resistor 302 and the upper primary winding of transformer 301 and from minus forty-eight volt potential through supervisory resistor 303 and the lower primary winding of transformer 301. When the station associated with line circuit 11 is in an on-hook or unanswered condition, loop current does not flow, finder line switch transistor 304 is conductive, and line transistor 305 is non-conductive. Transistor 305 is held non-conductive since its base electrode, which is returned to ground through resistors 306 and 302 and to minus forty-eight volt potential through resistor 307, is positive with respect to its emitter-collector electrodes. The first emitter-collector electrode of transisor 305 is returned through the parallel connected secondary windings of transformer 301 to minus eighteen volt potential, and the other emitter-collector electrode is connected by conductor L11 to one emitter-collector electrode of each of the bilateral transistors 401 and 402 in finder matrix 13 and connector matrix 15, respectively. Transistor 304 is held conductive at this time since its base electrode, which is returned through resistor 308 to ground and through resistors 309 and 303 to minus forty-eight volt potential, is negative with respect to its emitter electrode, which is returned to minus eighteen volt potential. The minus eighteen volt output signal from transistor 304 appearing across collector load resistor 310 is utilized to block the finder in gate FIG, which comprises diodes 311, 312 and 313. For this purpose, the collector electrode of transistor 304 is connected to the anode terminal of diode 311 which forms one input of a three-input "and" gate for negative signals.

It will be recalled from the general description that the assigned line finder of the system controls the finder matrix associated with that link to transmit a first control signal over conductor FPA to each line circuit each time that the finder registers have a setting corresponding to that line circuit. Thus, if link 1 is assigned for use, a negative-going signal appears periodically on conductor 1FPA11 and serves to render normally non-conducting finder pulse amplifier transistor 314 conductive. The resulting minus eighteen volt signal appearing at the collector of transistor 314 serves to render normally conducting inverter transistor 315 non-conductive and the output signal from transistor 315, appearing across collector load resistor 316 and which is coupled to the anode of diode 312, drops from minus eighteen volts to minus forty-eight volts. The third input to the gate is the output signal appearing across load resistor 317 in the collector circuit of transistor 318 and which is coupled to the anode terminal of diode 313. It will also be remembered from the general description that a control signal is applied to a FLB conductor by a connector matrix only when a line circuit is selected as a called line. Thus, if line circuit 11 is selected as a called line by link 1, a negative-going signal appears on conductor 1FLB11 and serves to render normally non-conducting line busy switch transistor 318 conductive. Whenever transistor 318 is conductive, a minus eighteen volt signal is applied to diode 313 and gate FIG is blocked. Thus, it can be seen that an output is obtained from the finder input gate FIG only when the station on the line is off-hook, when a negative signal is received over one of the FPA conductors, and when the line circuit has not been selected as a called line.

Assume that the station associated with line circuit 11 goes off-hook to initiate a call. Line current flows from ground through resistor 302, the upper primary winding of transformer 301, over the tip conductor, through the station subset, over the ring conductor, through diode 319, the lower primary winding of transformer 301, and through supervisory resistor 303 to minus forty-eight volts. The resulting voltage drop across supervisory resistor 303 serves to render transistor 304 non-conductive and its output signal drops from minus eighteen volts to minus forty-eight volts. The finder in gate is now unblocked and when a negative signal appears on one of the FPA conductors, the resulting negative signal appearing at the anode of diode 312 causes the output of gate FIG to drop from minus eighteen volts to minus forty-eight volts. This negative-going signal is coupled through capacitor 320 and diode 321 to conductor LP and, as will be described more fully hereinafter, controls the assigned line finder to terminate its searching operation. The loop current flow also results in a voltage drop across supervisory resistor 302 of such magnitude as to render line transistor 305 conductive.

Dial impulses generated at the substation interrupt and re-establish the loop current flow and the corresponding voltage drops across supervisory resistors 302 and 303 disappear and reappear, respectively. Transistor 305 is rendered non-conductive in response to each loop current interruption and serves to repeat the dial impulses to conductor L11 by interrupting the minue eighteen volt potential derived through the parallel connected secondary windings of transformer 301. Transistor 304 is held substantially non-conductive during the loop current interruptions and the large valued capacitors 322 and 340, connected to the base and collector, respectively, maintain gate FIG blocked during dial impulsing.

Voice signals appearing across the primary windings of transformer 301 are induced in the parallel connected secondary windings of transformer 301 and coupled through conducting bilateral transistor 305 to conductor L11. Capacitor 323 by-passes supervisory resistors 302 and 303 for voice frequency signals but permits dial impulses to appear across these resistors. Clamping diodes 324 and 325 prevent the voice signals induced in the secondary windings of transformer 301 from exceeding a value which would control the conductivity of bilateral transistor 305, and also limit the dial pulse transient peaks to a safe operating level for transistor 305.

When line circuit 11 is selected as the called line circuit by one of the links, the negative-going signal appearing on the corresponding FLB conductor serves to render transistor 318 conductive. As previously described, the minus eighteen volt potential appearing at the collector of transistor 318 and applied to the anode terminal of diode 313 serves to block the finder in gate FIG. The collector of transistor 318 is also coupled by resistor 326 to the base electrode of ringing control transistor 329. The base electrode of transistor 329 is also coupled to the collector electrode of transistor 304 by resistor 327 and diode 328. Ringing control transistors 329 and 330 form a flip-flop circuit in which transistor 329 is normally held conductive regardless of the state of conduction of transistor 304. If it be assumed that line circuit 11 is busy at the time when transistor 318 is rendered conductive, the minus forty-eight volt potential, appearing at the collector of transistor 304 and coupled through resistor 327 and diode 328, maintains transistor 329 conductive even though the collector of transistor 318 rises to minus eighteen volts. If it be assumed that the line is idle and transistor 304 is therefore conductive when transistor 318 is rendered conductive and a positive pulse is coupled through capacitor 341, the base electrode of transistor 329 is made more positive than its emitter electrode, which is returned to minus twenty-four volts, and transistor 329 is rendered non-conductive. The resulting negative swing at the collector of transistor 329 is coupled through capacitor 331 and resistor 332 to the base electrode of transistor 330 to render transistor 330 conductive.

Ringing gate RG, which is an "and" gate for positive pulses and which comprises diodes 333 and 334, is controlled by the collector potential of transistor 330. Conductor RCC is connected to the cathode terminal of diode 334 and carries ringing control pulses which are preferably of minus twenty-four volts potential and occur for one second each four seconds. That is, the waveform on conductor RCC stands at minus thirty-four volts for three seconds of each four-second interval and rises to minus twenty-four volts during the remaining one second of the four-second interval. This waveform can be generated by a series of multivibrators or by any other suitable pulse generator. When transistor 330 is non-conductive, the conduction through diode 333 to minus forty volt potential causes the anode terminals of both diodes 333 and 334 to stand at minus forty volts and the positive-going pulses appearing on conductor RCC are blocked by diode 334. When transistor 333 is conductive, however, a minus twenty-four volt, one-second pulse appears at the output of the gate every four seconds, is passed by diode 335, and renders ringing gate amplifier transistor 336 conductive. When transistor 336 is rendered conductive, its collector potential drops to minus thirty-four volts and generator control bilateral transistor 337 is rendered conductive to complete a circuit for the ringing generator voltage through the primary windings of ringing transformer 338. Ringing voltage induced in the secondary windings of transformer 338 is coupled through capacitor 339 to ring conductor R. Capacitor 339 charges to the peak value of the ringing voltage on the positive first quarter cycle through diode 319 and the relatively low impedance at ringing frequency of the lower secondary winding of transformer 301 and resistor 303. The potential of the upper terminal of capacitor 339 then follows the ringing source voltage negatively below minus forty-eight volts for the remaining portion of the cycle. Diode 319 is then reversed biased and offers a high impedance to the ringing current. Thus, the ringing current traverses the bridged ringer at the station and is returned to ground over tip conductor T and through the upper primary winding of transformer 31 and through resistor 302. The low level ringing voltage induced in the secondary windings of transformer 301 is coupled through capacitor 340 to conductor L11 and serves as a ring-back tone to inform the calling party that the called line is being rung.

When the call is answered, loop current flows, transistor 304 is rendered non-conductive, and transistor 305 is rendered conductive, all as previously described. When transistor 304 is rendered non-conductive and its collector potential drops to minus forty-eight volts, ringing control transistor 329 is rendered conductive. The resulting positive-going swing at the collector of transistor 329 renders transistor 330 non-conductive to block gate RG and thus trip the ringing by preventing further operation of transistors 336 and 337.

As used in this circuit, transistor 337 may be type ZJ–20, transistor 336 may be type GT–692, and the remaining transistors may all be type 2N44.

*Line finder portion of finder-connector 16*

Figure 5:
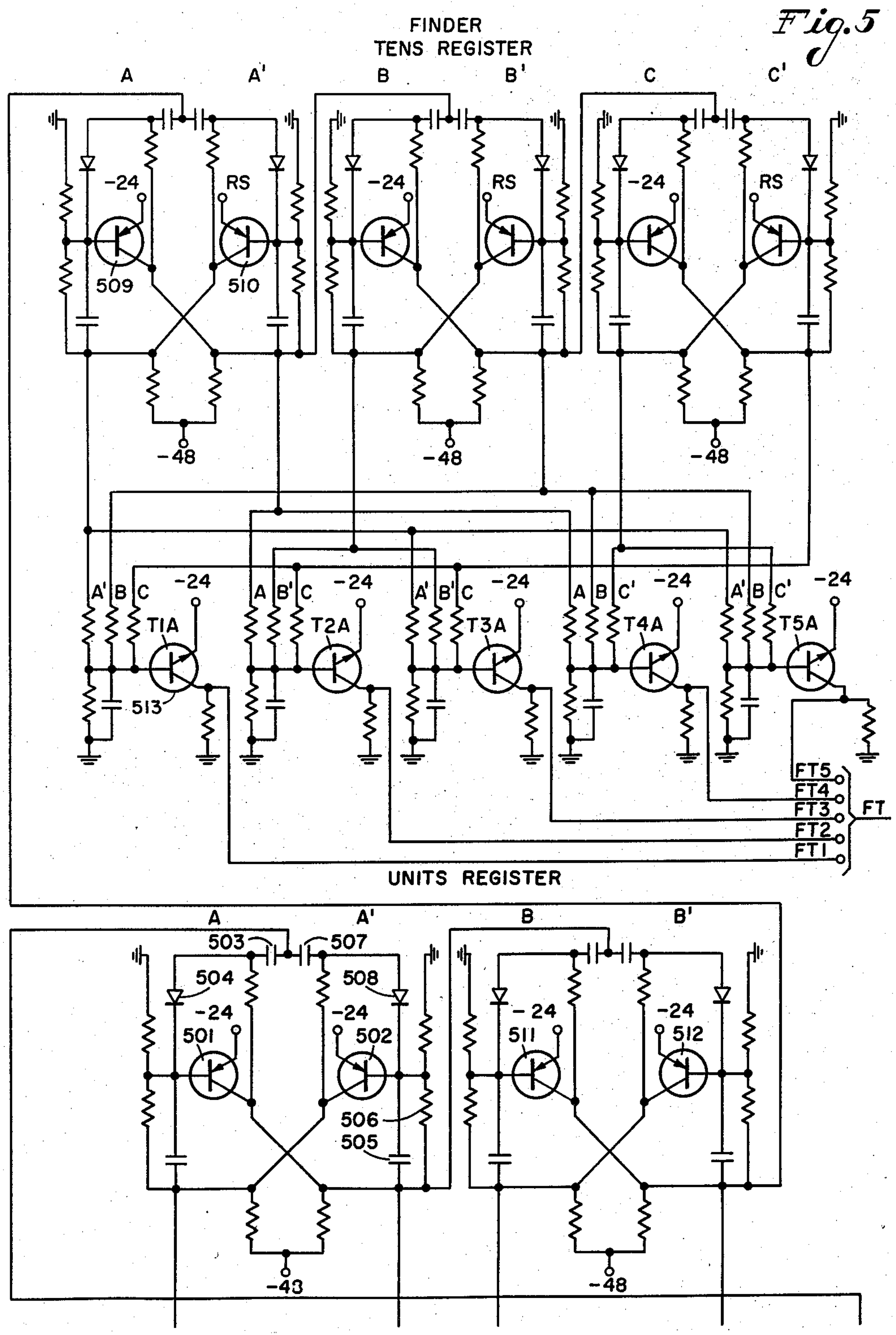
Figure 10:
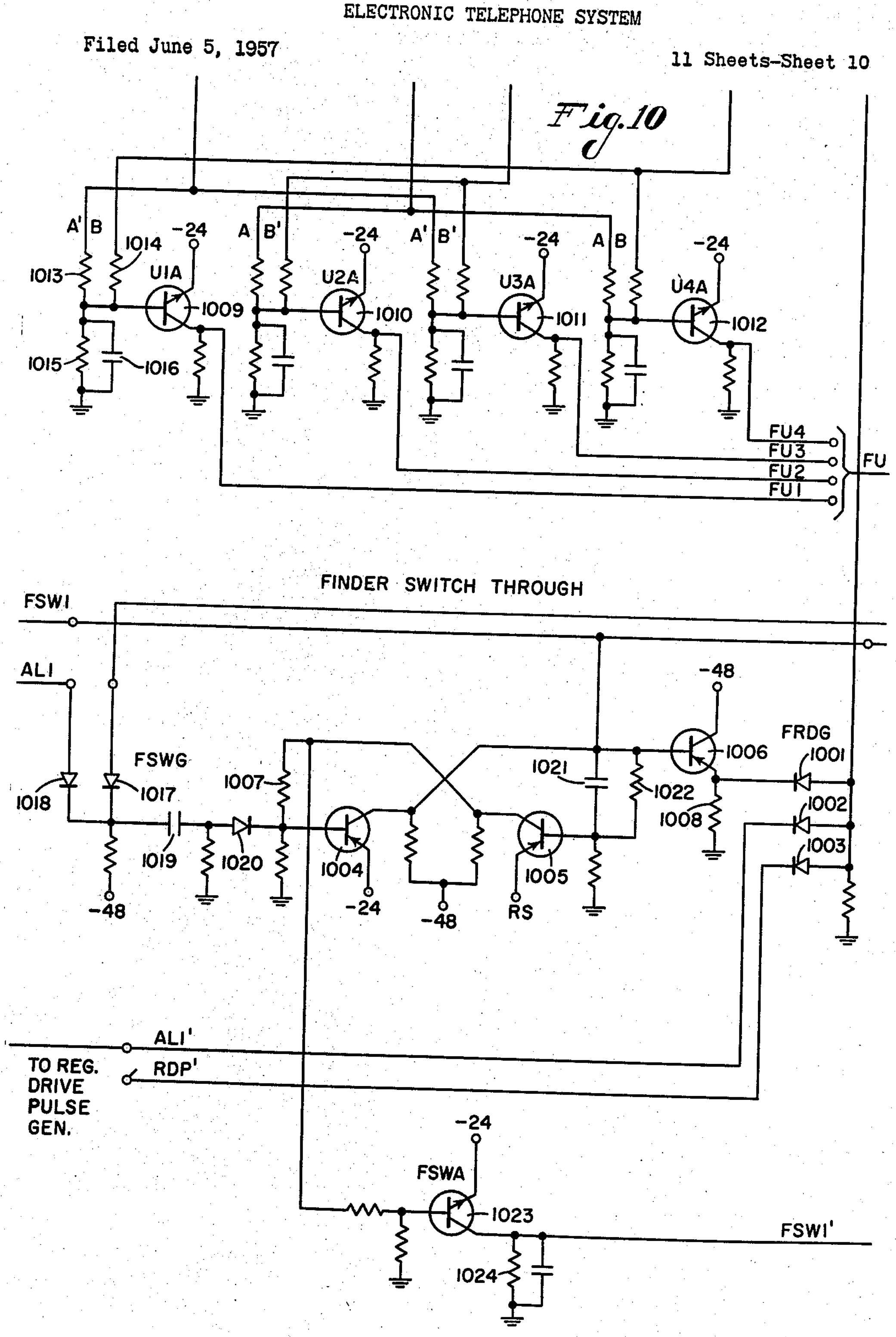

The line finder portion of finder-connector 16 is shown in detail in Figs. 5 and 10 of the drawings. The chief elements of the line finder circuit are a units register, a tens register, a finder switch-through flip-flop circuit, a finder switch-through amplifier, a finder register drive gate, and a finder switch-through gate. It will be noted that the registers in this circuit as well as in the connector circuit are of the binary type. Thus, the system is readily expandable with the addition of a minimum amount of equipment.

The finder register drive gate FRDG comprises diodes 1001, 1002, and 1003 connected in an "and" gate for positive signals configuration. The first input to the gate, namely, diode 1001, is controlled by the operated condition of the finder switch-through flip-flop circuit, comprising transistors 1004 and 1005, which, in turn, controls the operation of emitter follower transistor 1006. Transistor 1004 is conductive whenever the illustrated line finder is not engaged in a call. To assure this condition, the emitter of transistor 1005 is returned to a reset circuit in the connector by conductor RS. The potential of conductor RS stands at minus twenty-four volts at all times except during a short period following the release of a connection when it stands at minus forty-eight volts. When conductor RS goes to minus forty-eight volts, transistor 1005 is rendered non-conductive, the potential of its collector electrode drops to approximately minus forty volts and because of the cross-coupling through resistor 1007, transistor 1004 is rendered conductive. When the potential of conductor RS returns to minus twenty-four volts, transistor 1005 remains non-conductive since its base electrode is slightly positive with respect to its emitter electrode. With transistor 1004 conductive and its collector potential standing at minus twenty-four volts, an output signal of approximately minus twenty-four volts appears across load resistor 1008 in the emitter circuit of emitter follower transistor 1006 and is coupled to the cathode terminal of diode 1001. The cathode terminal of diode 1002 is connected to conductor AL1′ which stands at minus thirty-four volts when the illustrated link is not assigned for use and rises to ground potential when the link is assigned for use. The cathode terminal of diode 1003 is connected to conductor RDP′ which normally stands at minus thirty-four volts and carries recurring minus twenty-four volt pulses. The exact recurrence frequency of these pulses is not critical and may be in the order of four or five kc. These pulses may be generated by a multivibrator or by any other suitable type of pulse generator.

It can be seen that when the illustrated link is not assigned for use, the minus thirty-four volt potential appearing on conductor AL1′ effectively blocks gate FRDG and the output of the gate remains at minus thirty-four volts. However, when the illustrated link is assigned for use and conductor AL1′ stands at ground potential, the output signal from the gate follows the potential of conductor RDP′. The output signal from gate FRDG is coupled to the input of the first binary stage of the units register, which is shown in Fig. 5. The conductivity of A and A′ transistors 501 and 502, respectively, in the first stage of the units register is changed by each pulse appearing in the output of gate FRDG. If it be assumed that transistor 501 is conductive, a positive-going pulse applied to the input of the first stage is coupled through capacitor 503 and steering diode 504 to the base of transistor 501 to render said transistor non-conductive. The resulting negative voltage swing at the collector of transistor 501 is coupled through capacitor 505 and resistor 506 to the base electrode of transistor 502 to render transistor 502 conductive. The next positive input pulse is coupled through capacitor 507 and steering diode 508 to render transistor 502 non-conductive and transistor 501 conductive. The second or B stage of the units register is, of course, stepped only when transistor 501 is rendered conductive and the potential of its collector electrode rises from minus forty volts to minus twenty-four volts. This positive-going pulse is coupled through a capacitor and a steering diode to transfer the operation of the second stage transistors. Similarly, the first tens register stage, comprising A and A′ transistors 509 and 510, respectively, is controlled by the output signal from the second or B units register stage and is operated at one-half the frequency of the second units stage. The output of the A tens register stage controls the operation of the B tens register stage and the output of the B tens register stage controls the operation of the C register stage.

The output signals from the various units register transistors are combined in such a way that only one of the units amplifiers, comprising transistors 1009, 1010, 1011, and 1012, is conductive at any given time. For example, it can be seen that the base of units one amplifier transistor 1009 is coupled to the collector electrode of A′ transistor 502 of the units register through resistor 1013, and to the collector electrode of the B transistor 511 of the units register through resistor 1014. The base of transistor 1009 is also returned to ground potential through resistor 1015, which is by-passed by capacitor 1016. Thus, the base electrode of transistor 1009 is positive with respect to its emitter electrode and transistor 1009 is rendered conductive only when the collectors of both transistors 502 and 511 stand at minus twenty-four volts. If it be assumed that the units register is set so as to render transistor 1009 conductive, the next drive pulse gated through by gate FRDG serves to render transistor 502 non-conductive, transistor 501 becomes conductive, transistor 511 is rendered non-conductive, and transistor 512 becomes conductive. Now, with A transistor 501 and B′ transistor 512 conductive, units two amplifier transistor 1010 is rendered conductive. It can be seen that the potential of the units conductors FU1–FU4, which are connected to the collector electrodes of transistors 1009–1012, respectively, drops from ground potential to minus twenty-four volts only when the amplifier transistor associated with that particular conductor is conductive and that minus twenty-four volt potential is applied to each of the conductors in successive order.

Since the tens register comprises three binary divider stages, it is necessary to gate the output signals from one transistor in each stage together to control the conductivity of the tens amplifier transistors. For example, it can be seen that tens one amplifier transistor 513 is rendered conductive to apply minus twenty-four volt potential to finder tens one conductor FT1 only when the A′, B and C transistors of the tens register are conductive. It will now be apparent that minus twenty-four volt potential is applied to the finder tens conductors FT1–FT5 in successive order and that minus twenty-four volt potential is applied to each tens conductor for a period of time equal to the time required to apply minus twenty-four volt potential to each of the finder units conductors in turn. As described in the general description, the finder tens and units conductors are gated together in unique combinations in the finder matrix 13 to establish the identity of each of the lines of the system.

It will be recalled that a line circuit releases a negative-going pulse to conductor LP only when that line circuit is initiating a call and when the registers of the assigned line finder are in a setting which identifies that line. The negative-going pulse is amplified and inverted by the line pulse amplifier 20 transistor 403, which may be type 2N44, of Fig. 4 and the resulting positive-going pulse is applied to conductor LPA which extends to all of the line finders of the system. Conductor LPA is connected to the anode terminal of diode 1017 in the line finder circuit of Fig. 10. Diodes 1017 and 1018 form a finder switch-through gate which is inhibited whenever the link is not assigned for use. For this purpose, conductor AL1, which extends from the link allotter circuit, is connected to the anode terminal of diode 1018. Conductor AL1 stands at minus twenty-four volts when link 1 is not allotted and drops to minus forty-eight volts when link 1 is assigned for use. Thus, a positive pulse applied to conductor LPA by the line pulse amplifier 20 is passed by gate FSWG only when the link is assigned for use. The positive pulse appearing at the output of the gate is coupled through capacitor 1019 and diode 1020 and applied to the base electrode of normally conducting transistor 1004 to render said transistor non-conductive. The resulting negative voltage swing at the collector of transistor 1004 is coupled through capacitor 1021 and resistor 1022 to the base electrode of transistor 1005 and renders that transistor conductive. As previously explained, when transistor 1004 is non-conductive and its collector potential stands at minus forty volts, the output signal across load resistor 1008 in the emitter circuit of emitter follower transistor 1006 drops to minus forty volts and the finder register drive gate FRDG is blocked. Thus, the finder tens and units registers remain in the setting corresponding to the calling line and control the appropriate tens and units amplifiers to apply minus twenty-four volts to the tens and units conductors corresponding to that line for the duration of the call. Also, when transistor 1005 becomes conductive and its collector potential rises to minus twenty-four volts, finder switch-through amplifier transistor 1023 is rendered conductive and the potential appearing across collector load resistor 1024 and applied to conductor FSW1′ falls from ground to minus twenty-four volts. The minus twenty-four volt potential applied to conductor FSW1′ serves to render conductive the cross-point transistor corresponding to the calling line in finder matrix 13. As previously described, at the completion of the call, the potential on conductor RS drops to minus forty-eight volts, transistor 1005 is rendered non-conductive, transistor 1004 becomes conductive, and the finder tens register is reset by virtue of the connection of the emitters of transistors A′, B′, and C′ to conductor RS. When the link is next assigned for use, the finder tens and units registers begin their searching operation. As used in the line finder circuit, transistors 1004, 1005, 1006, and all of the units and tens register transistors may be type 2N44. The units and tens amplifier transistors and transistor 1023 may be type GT–692.

*Link allotter 17*

Figure 9:
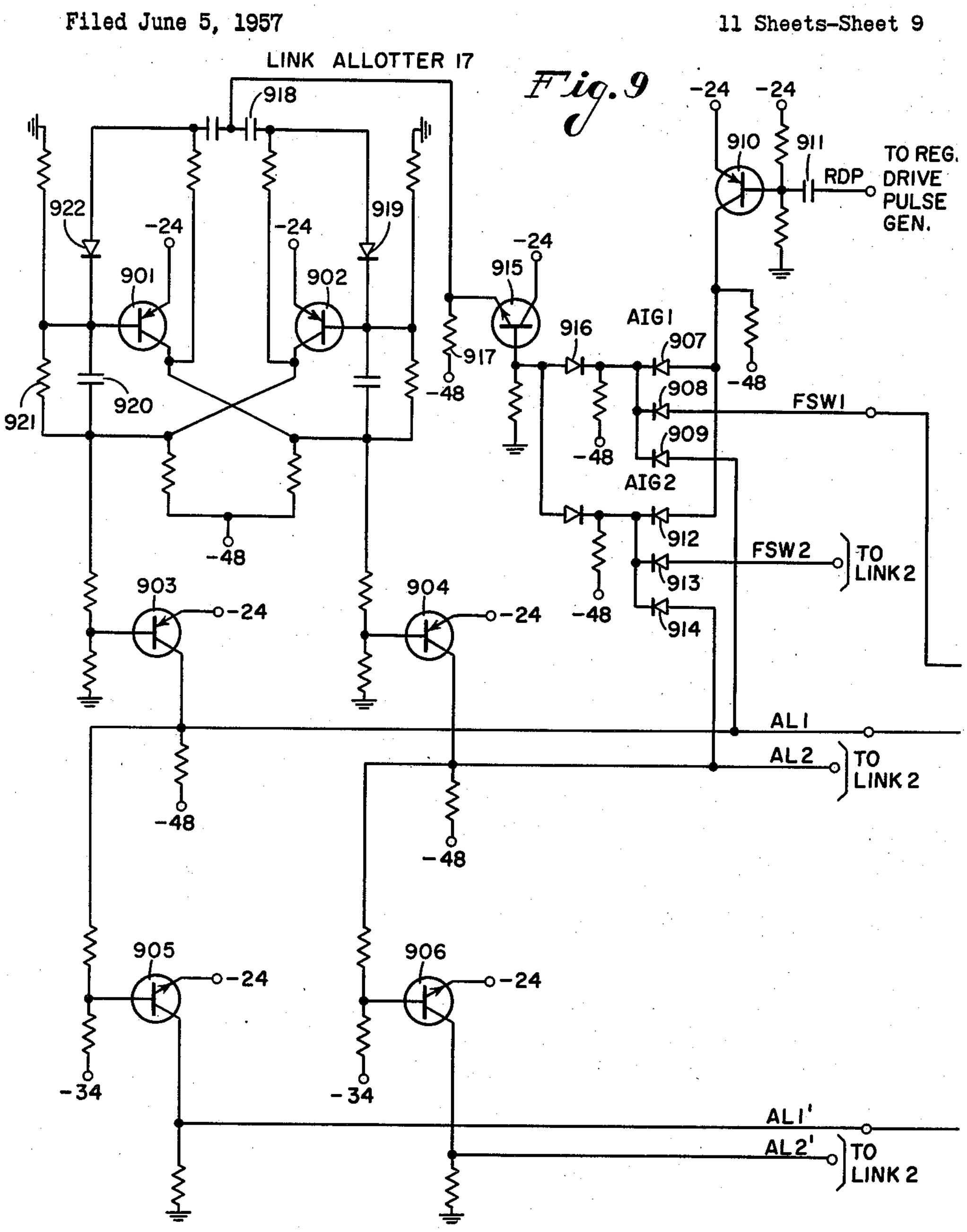
Figure 12:
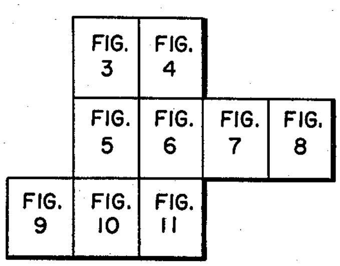

Link allotter 17 is shown in detail in Fig. 9 of the drawings. The link allotter has been illustrated as being capable of assigning just two links for use in turn but with slight modification, as will be explained more fully hereinafter, can be expanded to handle any number of links.

If it be assumed that link 1 has been assigned for use and has not yet seized a calling line, transistors 902, 904 and 906 are conductive. Under these conditions, conductor AL1 stands at minus forty-eight volts, conductor AL1′ stands at ground potential, conductor AL2 stands at minus twenty-four volts, conductor AL2′ stands at minus thirty-four volts, and conductor FSW1 from the line finder of link 1 stands at minus twenty-four volts. It will be remembered from the description of the line finder circuit that the finder register drive gate and the finder switch-through gate in the line finder are enabled to pass pulses only when ground potential is applied to conductor AL1' and minus forty-eight volt potential is applied to conductor AL1, respectively. Thus, these gates are enabled in the assigned line finder and are blocked in the other line finders of the system. The allotter remains in this setting until the line finder of link 1 seizes a calling line since allotter input gate AIG1 is blocked by the potential appearing on conductor FSW1. Gate AIG1, which comprises diodes 907, 908 and 909, is an "and" gate for negative pulses. The anode terminal of diode 907 is connected to the collector electrode of inverter amplifier transistor 910. Transistor 910 is, in turn, controlled by negative-going pulses appearing on conductor RDP, which pulses may be generated by any suitable source and which may have a recurrence frequency of four or five kc., as previously explained, and coupled through capacitor 911 to its base electrode. Transistor 910 is rendered conductive by each negative pulse and serves to generate a positive-going minus twenty-four volt pulse which is couplied to the anode of diode 907. The anode terminal of diode 908 is connected to conductor FSW1, which stands at minus twenty-four volt potential until link 1 has seized a calling line. The anode terminal of diode 909 is connected to conductor AL1, which stands at minus forty-eight volts at this time, as previously described. Thus, it can be seen that the potential appearing on conductor FSW1 effectively blocks gate AIG1 at this time and that the output of the gate remains at minus twenty-four volts to hold transistor 915 conductive.

The link 2 allotter input gate AIG2, which comprises diodes 912, 913 and 914, is also blocked at this time by the minus twenty-four volt potential appearing on conductor AL2 and which is coupled to the anode terminal of diode 914. Positive pulses appearing in the output of transistor 910 are coupled to the anode terminal of diode 912 and the anode terminal of diode 913 is connected to conductor FSW2, which may stand at either minus twenty-four volts or at minus forty-eight volts depending upon whether link 2 is idle or is engaged with a call, respectively.

When link 1 seizes a calling line, the finder switch-through circuit transistor 1004 is rendered non-conductive and the potential of conductor FSW1 drops to minus forty volts, as previously described. Since the other inputs to gate AIG1 are more negative than minus forty volts, the output signal from the gate drops to minus forty volts and transistor 915 is rendered non-conductive through diode 916. The negative potential swing at the collector of transistor 915 has no effect on the conductivity of transistors 901 and 902 in the allotter register since steering diodes 919 and 922 block the negative pulse. When the next minus twenty-four volt pulse is received from transistor 910, the output of gate AIG1 rises to minus twenty-four volts and transistor 915 is again rendered conductive. The resulting positive-going pulse appearing across load resistor 917 in the emitter circuit of transistor 915 is couplied through capacitor 918 and steering diode 919 to the base of transistor 902 to render transistor 902 non-conductive. The collector potential of transistor 902, of course, drops to minus forty volts and serves to render transistor 903 conductive. When transistor 903 becomes conductive, the potential of its collector and thus the potential of conductor AL1 rises to minus twenty-four volts and transistor 905 is rendered conductive to apply minus thirty-four volt potential to conductor AL1'. The minus twenty-four volt potential applied to conductor AL1 blocks gate AIG1 to prevent further stepping of the allotter register. The negative potential swing at the collector of transistor 902 is also coupled through capacitor 920 and resistor 921 to the base of transistor 901 and renders transistor 901 conductive. When transistor 901 becomes conductive, transistors 904 and 906 are rendered non-conductive, the potential of conductor AL2 drops to minus forty-eight volts, and the potential of conductor AL2' rises to ground. If link 2 is not busy with a call at this time and conductor FSW2 therefore stands at minus twenty-four volts, gate AIG2 is also blocked and link 2 is assigned until that link seizes a calling line. However, if link 2 has seized a calling line and conductor FSW2 stands at minus forty volts, the next positive pulse appearing in the output of transistor 910 is passed by gate AIG2 and serves to advance the allotter to assign the next succeeding line finder for use. Thus, it can be seen that if all links are busy, the allotter is stepped at the recurrence frequency of the pulses appearing on conductor RDP and continuously searches for an idle link.

More links can be served by the illustrated finder by adding binary frequency divider stages similar to the first stage comprising transistors 901 and 902. Amplifier stages identical to transistors 903 and 905 must, of course, be added for each link served, and control of these stages is achieved by resistive coupling the base of the amplifier transistors, similar to transistor 903, to one output of each stage of the register in the exact same manner as illustrated in the line finder of Figs. 5 and 10.

As used in this circuit, transistors 901–904 and 910 may be type 2N44, and transistors 905, 906 and 915 may be type GT–692.

*Finder matrix 13*

Figure 4:
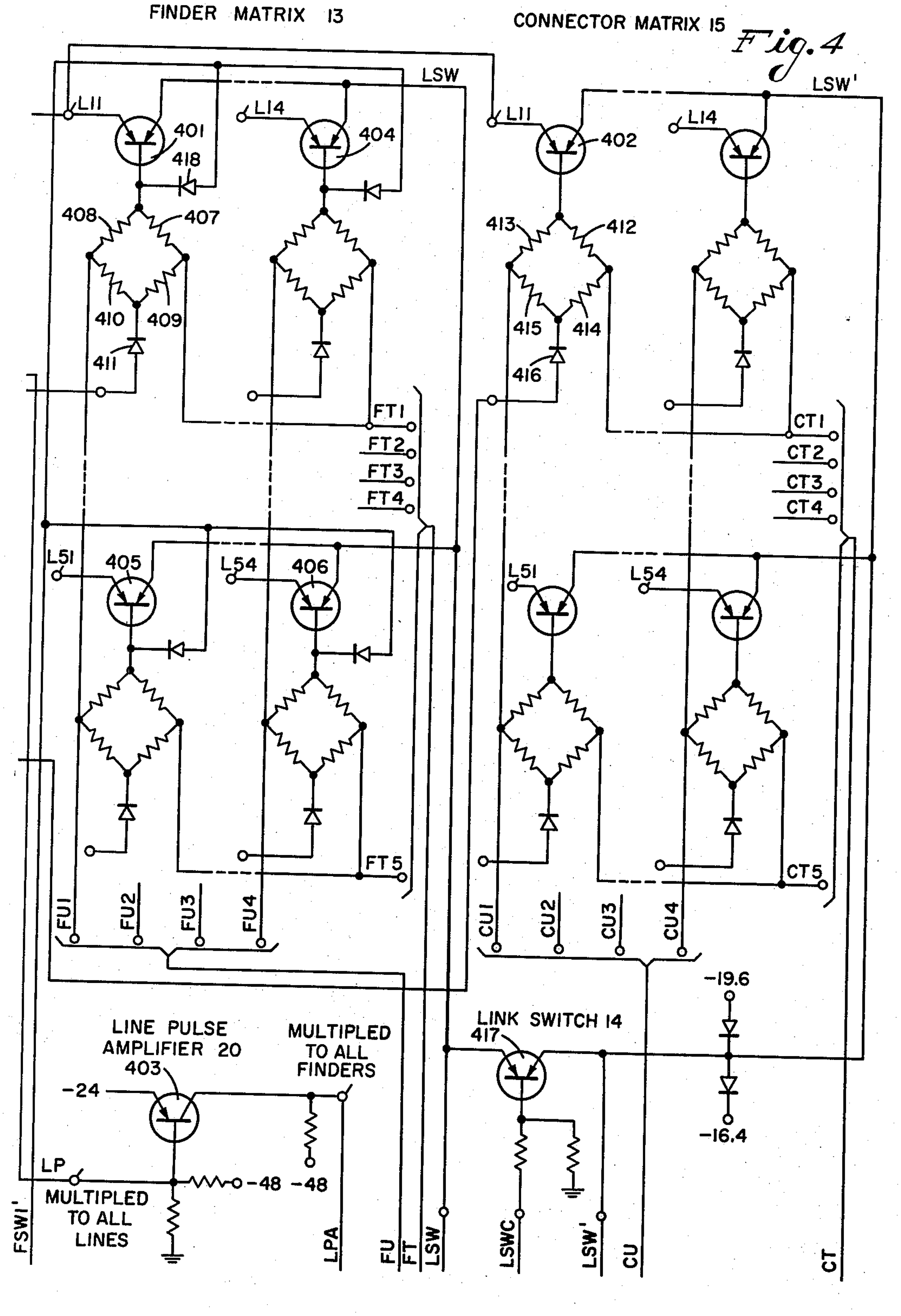
Figure 6:
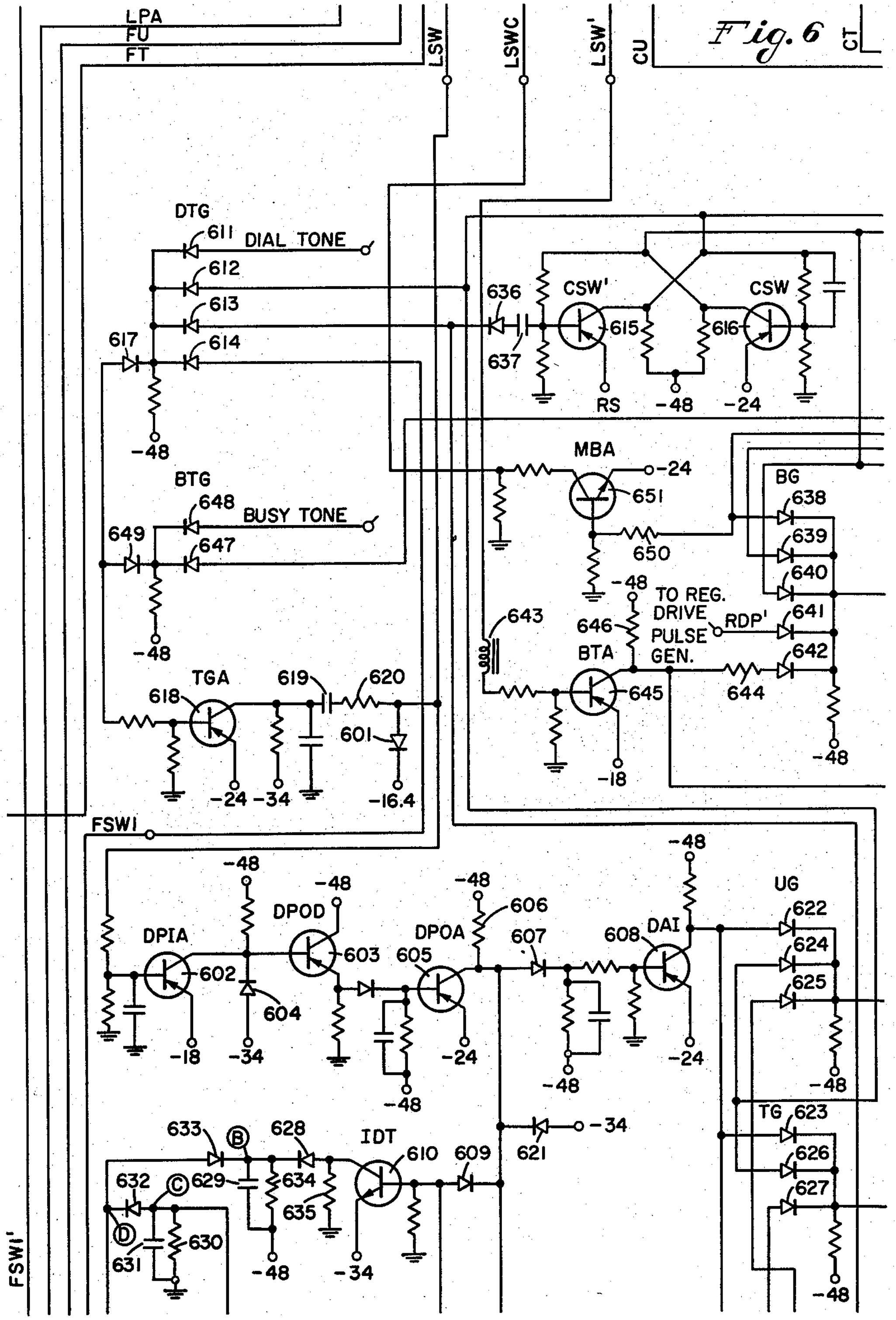
Figure 7:
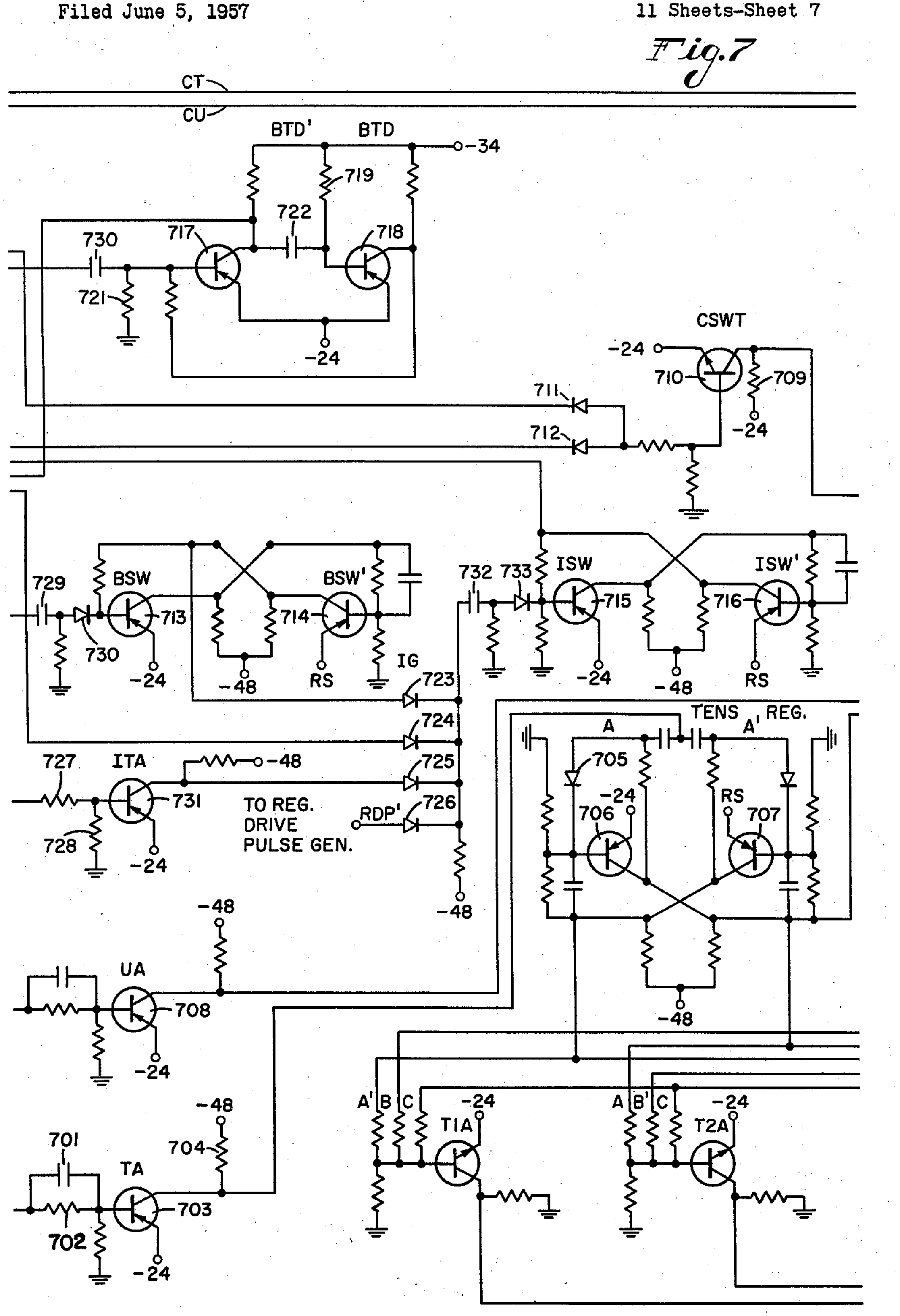
Figure 8:
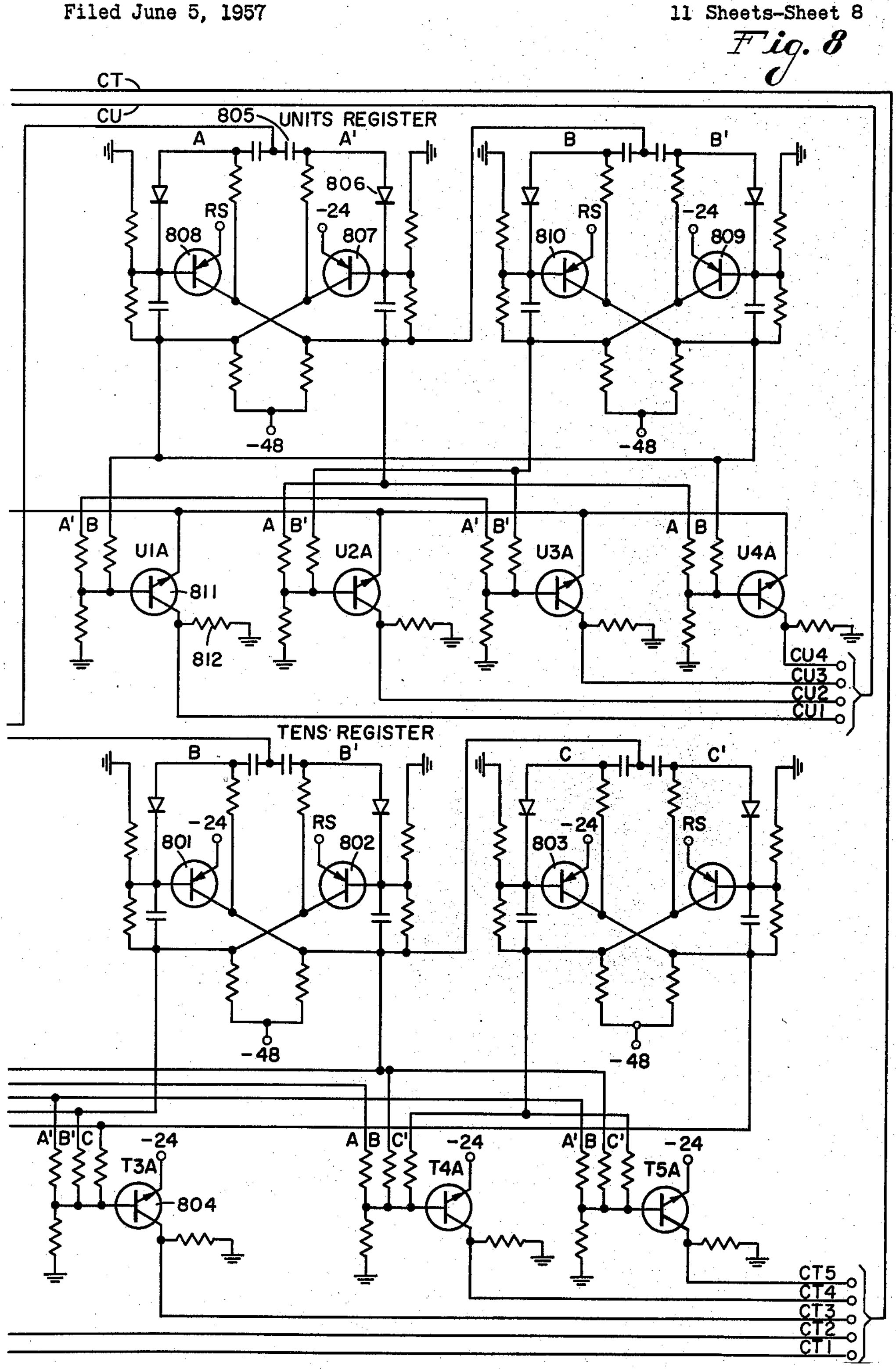

Finder matrix 13, which is shown in detail in Fig. 4 of the drawings, comprises a controllable cross-point bilateral transistor switch for each line of the system. The system has been illustrated as equipped for twenty lines which are divided into five groups of four lines each. Transistor 401 is individual to line circuit 11, transistor 404 is individual to line circuit 14 (not shown), transistor 405 is individual to line circuit 51 (not shown), and transistor 406 is individual to line circuit 54 (not shown). The first emitter-collector electrode of each cross-point transistor is individually connected to an emitter-collector electrode of the line transistor associated with one of said lines, the second emitter-collector electrode is connected to the single output conductor from the finder matrix LSW, and the base electrode is connected through resistors to the appropriate tens and units conductors which identify that line circuit and through a diode to conductor FSW1'. For example, the first emitter-collector electrode of transistor 401 is connected by conductor L11 to an emitter-collector electrode of transistor 305 which is individual to line circuit 11, the second emitter-collector electrode of transistor 401 is connected in multiple with the second emitter-collector electrodes of all of the bilateral transistor switches of the matrix to the output conductor LSW, which is returned to minus 16.4 volts through diode 601 in Fig. 6, and the base electrode of transistor 401 is coupled through equal-valued resistors 407 and 408 to conductors FT1 and FU1, respectively, and through diode 418 to conductor FSW1'.

It will be remembered from the description of the line finder that all but one of the finder tens and all but one of the units conductors normally stand at ground potential. When link 1 is assigned for use and the line finder is searching for a calling line, minus twenty-four volt potential is applied to each of the units conductors in turn while minus twenty-four volt potential is applied to one of the finder tens conductors and the units conductors are then energized in turn again while minus twenty-four volt potential is applied to the next succeeding tens conductor.

Finder tens one conductor FT1 and finder units one conductor FU1 are connected through resistors 409 and 410, respectively, to the cathode terminal of diode 411 for the purpose of transmitting a first control signal to line circuit 11 when the line finder registers are in a setting corresponding to that line circuit. The anode terminal of diode 411 is connected to the base electrode of finder pulse amplifier transistor 314 in line circuit 11 by conductor 1FPA11. As previously described, transistor 314 is normally nonconductive since its base is held slightly above minus eighteen volt potential. Thus, when either conductor FT1 or conductor FU1 stands at minus twenty-four volts while the other conductor stands at ground potential, no output is realized from diode 411. However, when both FT1 and FU1 stand at minus twenty-four volts, minus twenty-four volt potential is applied to the base of transistor 314 to render said transistor conductive. It will be remembered that the line circuit transmits a second control signal to the line finder over conductor LP only if the line circuit is in a calling condition for the purpose of terminating the searching operation of the line finder. If the line circuit is not in a calling condition and the second control signal is not transmitted, the line finder advances to the next line.

Even though conductors FT1 and FU1 both stand at minus twenty-four volts, transistor 401 is prevented from becoming conductive until after the line finder switches through. For this purpose, the base electrode of transistor 401 is connected to the cathode terminal of diode 418 and the anode electrode of diode 418 is connected to conductor FSW1′. It will be remembered from the description of the line finder that conductor FSW1′ stands at ground potential until the line finder switches through. Because of the voltage division across resistor 1024 of Fig. 10 and resistors 407 and 408, the base of transistor 401 is held positive with respect to its emitter-collector electrodes and it remains non-conductive. When the line finder switches through and minus twenty-four volt potential is applied to conductor FSW1′, the base of transistor 401 drops to minus twenty-four volts and transistor 401 becomes conductive. The other cross-point transistor switches remain non-conductive since one or both of their controlling tens or units conductors are at ground potential and their associated diode, corresponding to diode 418, is poled for non-conduction when conductor FSW1′ drops to minus twenty-four volts. The cross-point transistors are prevented from becoming conductive during the searching operation so as to prevent interference with established conversations and also to prevent the generation of false dial impulses on conductor LSW as will be explained more fully in the connector description which follows.

If it be assumed that line circuit 11 is in a calling condition and line transistor 305 is therefore conductive, the line finder remains in a setting in which minus twenty-four volts is applied to both conductors FT1 and FU1, transistor 401 is conductive and the minus eighteen volt potential appearing on conductor L11 is coupled through transistor 401 to conductor LSW. Dial tone originating in the connector and applied to conductor LSW is coupled through conducting transistors 401 and 305 to the secondary windings of transformer 301 and thus to the calling party. During each dial impulse received over the calling line, transistor 305 in line circuit 11 is rendered non-conductive to disconnect the minus eighteen volt potential from conductor L11. The potential on conductor LSW follows the potential applied to the base of transistor 401 and thus drops to minus twenty-four volts to repeat the dial impulse to the connector circuit.

All transistors used in the finder matrix may be type SC–101.

*Connector matrix 15*

The connector matrix 15, which is also known in detail in Fig. 4, is similar to the finder matrix just described and comprises a bilateral transistor switch for each line circuit of the system. At the completion of the second digit received from a calling line, the connector circuit functions to apply minus twenty-four volt potential to the tends and units conductors corresponding to the selected called line. If it be assumed that line circuit 11 is the selected called line, the connector circuit applies minus twenty-four volts to conductors CT1 and CU1 to render transistor 402 conductive. The base of transistor 402, which transistor is individual to line circuit 11, is connected to conductors CT1 and CU1 through resistors 412 and 413, respectively. The minus twenty-four volt potential applied to conductors CT1 and CU1 is also coupled through resistors 414 and 415, through diode 416, and over conductor 1FLB11 to the base electrode of normally non-conductive transistor 318 in line circuit 11 to render said transistor conductive. As previously explained, the signal applied to conductor 1FLB11 serves to initiate ringing in line circuit 11 if the line circuit is idle, and also serves to prevent an output from the finder in gate when the station associated with line circuit 11 goes off-hook to answer the call.

A busy test of the called line circuit is made by the connector circuit over conductor LSW′. If the selected called line is in an on-hook condition and is not being rung under control of another link, conductor LSW′ follows the potential of the base electrode of conducting transistor 402 and thus stands at minus twenty-four volts. If the selected called line is in an answered or off-hook condition, the line transistor 305 is conductive and the minus eighteen volt potential appearing on conductor L11 is coupled through conducting transistor 402 to conductor LSW′. Similarly, if line circuit 11 has been selected but the ringing signal applied to the line has not been answered, the minus eighteen volt potential appearing on the L conductor from the calling line circuit is coupled through the bilateral transistor associated with that line circuit in the finder matrix for that link, through the link switch for that link corresponding to transistor 417, and through the bilateral transistor corresponding to transistor 402 in the connector matrix for that link, and thus appears on conductor L11. Thus, when transistor 402 is rendered conductive by the connector circuit of link 1, the minus eighteen volt potential appearing on conductor L11 is applied to conductor LSW′ and serves to mark line circuit 11 as busy.

All transistors used in the connector matrix may be type SC–101.

*Link switch 14*

Link switch 14 is also shown in detail in Fig. 4 of the drawings. The link switch comprises a single bilateral transistor 417, which may be type SC–101, having its first emitter-collector electrode connected to conductor LSW, its second emitter-collector electrode connected to conductor LSW′, and its base electrode connected to link switch control conductor LSWC, which extends to the connector circuit. A minus twenty-four volt operating potential is applied to conductor LSWC by the connector circuit only if the selected called line tests idle. At the time that the operating potential is applied to conductor LSWC, a bilateral cross-point switch has been operated in both the finder matrix 13 and the connector matrix 15. Since conductor LSW stands at minus eighteen volts, the minus twenty-four volt signal applied to the base of transistor 417 serves to render that transistor conductive. The minus eighteen volt potential appearing on conductor LSW is thus coupled through conducting transistor 417 to conductor LSW′, through the conducting cross-point transistor and the connector matrix 15 to the L conductor associated with the called line circuit and thus serves to mark the selected called line circuit busy to the other connectors of the system. When the call has been answered at the selected station, talking signals appearing on conductors LSW and LSW' from the calling and called line circuits, respectively, are coupled through transistor 417 on a bilateral basis.

*Connector portion of finder-connector 16*

The connector portion of finder-connector 16 is shown in detail in Figs. 6, 7, 8 and 11 of the drawings. The principal functions of the connector circuit are to apply dial tone to the calling line when that line is seized by the line finder associated with the connector, to register the tens and units digits received from the calling line circuit, to make a busy test of the selected called line, to apply busy tone to the calling line if the selected called line is busy, to operate the link switch 14 if the called line is idle, and to reset the various flip-flop and register circuits of the finder and connector when the call is terminated.

Figure 11:
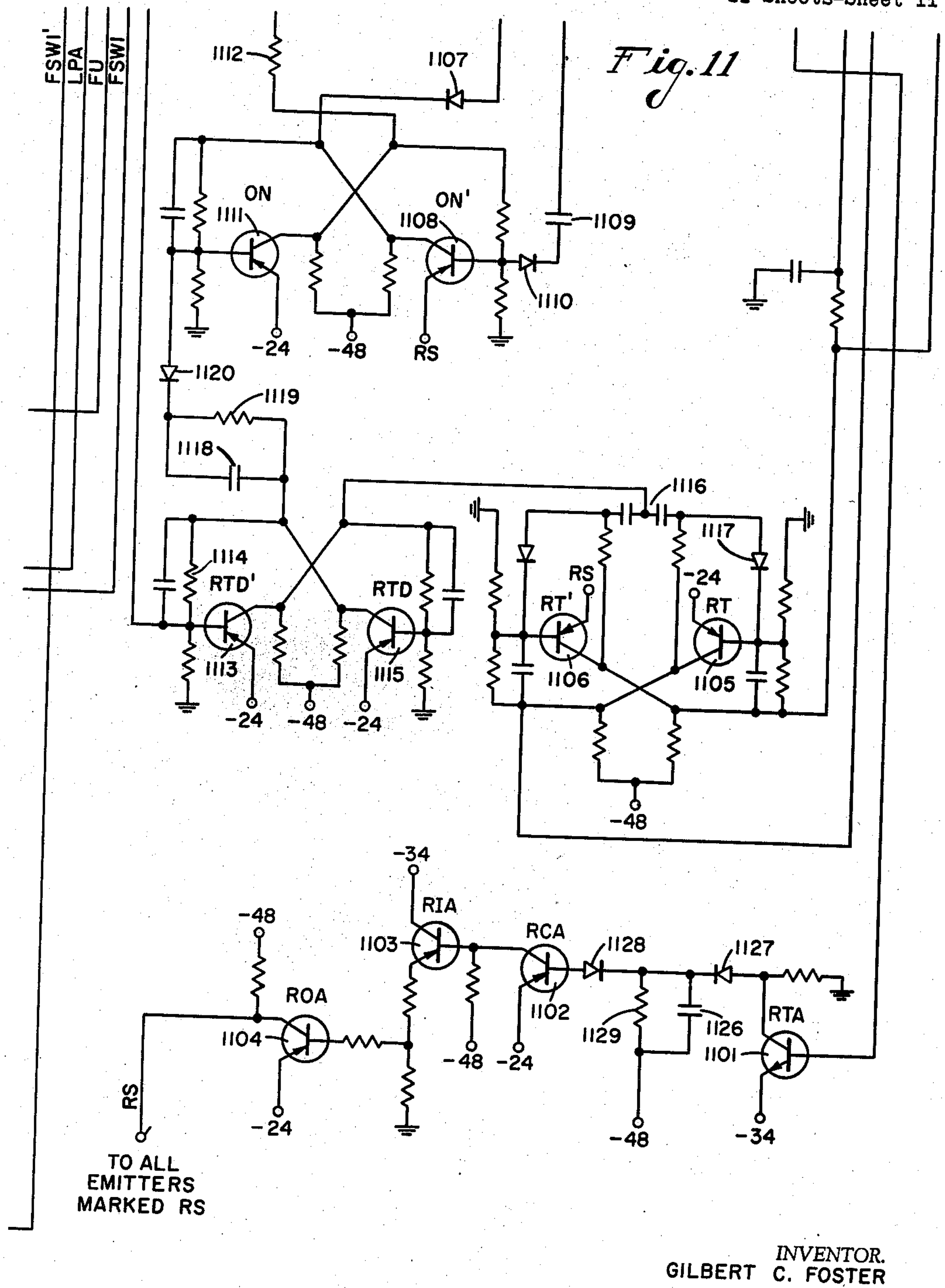

The reset of the various connector flip-flop and register circuits is controlled by the reset circuit comprising transistors 1101, 1102, 1103 and 1104 of Fig. 11. Since the reset circuit does not function until the termination of a call, its complete operation is best described after a call has been traced through the connector circuit. At this point in the description, it is believed sufficient to note that transistor 1104 is normally conductive and is rendered non-conductive for a short period at the termination of a call so that the potential of conductor RS normally stands at minus twenty-four volts and drops to minus forty-eight volts only when transistor 1104 is rendered non-conductive. Conductor RS is multipled to the emitter electrodes of all of the primed stages in the various flip-flop circuits and in the tens register circuit for the purpose of resetting all of these circuits to the condition wherein the unprimed transistors are conductive. The units register differs, however, in that the emitter electrodes of the unprimed transistors are connected to conductor RS and when the connector circuit is idle, the primed stages are therefore conductive. To illustrate the operation at reset of each flip-flop circuit, it can be seen that the register transfer flip-flop circuit, which comprises transistors 1105 and 1106 and which is utilized to control the gating of the impulses of the first digit to the tens register and the impulses of the second digit to the units register, is arranged in such manner that the unprimed transistor 1105 is conductive when the connector circuit is idle. It can be seen that when the potential of conductor RS drop to minus forty-eight volts at the termination of the call, the emitter of transistor 1106 is negative with respect to its base electrode and, if the transistor is conductive, it becomes non-conductive. The resulting negative potential swing at the collector of transistor 1106 renders transistor 1105 conductive and that transistor remains conductive when the potential of conductor RS returns to minus twenty-four volts. All of the other flip-flop circuits and register circuits are controlled in the exact same manner.

It will be recalled that conductor LSW from the finder matrix 13 normally stands at minus 16.4 volts by virtue of the conduction through diode 601 when a cross-point transistor has not been operated to seize a calling line. It will also be recalled that the cross-point transistors are prevented from becoming conductive as the line finder searches for a calling line so as to prevent the application of varying potentials to conductor LSW during the searching operation. Under these conditions, the base of dial pulse input amplifier 602 is positive with respect to its emitter electrode and transistor 602 is therefore non-conductive. Dial pulse output driver transistor 603 is conductive since its base electrode is returned to minus thirty-four volts, as determined by the voltage drop across clamping diode 604, and approximately minus thirty-four volt potential is therefore applied to the base of dial pulse output amplifier transistor 605. Transistor 605 is thus conductive and the minus twenty-four volt output signal appearing across load resistor 606 in the collector circuit of transistor 605 is coupled through diode 607 to the base of dial amplifier inverter transistor 608 and holds that transistor normally non-conductive. The output signal from transistor 605 is also coupled to the anode terminal of diode 609 but diode 609 is poled in the reverse direction at this time since its anode terminal is coupled through diode 1107 to the collector electrode of normally non-conductive off-normal transistor 1108. The minus forty volt potential coupled through diode 1107 holds transistor 610 non-conductive.

When the line finder associated with the illustrated connector circuit switches through to a calling line, the cross-point transistor corresponding to the calling line circuit in finder matrix 13 is rendered conductive and the secondary winding of the line circuit repeat coil, which is returned to minus eighteen volts, is connected to conductor LSW. Since the base of transistor 602 is still positive with respect to its emitter, transistor 602 remains non-conductive. However, when the line finder switches through and minus forty volt potential is applied to conductor FSW1, the dial tone gate DTG of Fig. 6, which comprises diodes 611, 612, 613 and 614, is enabled to apply dial tone to the calling line. Dial tone, which may be generated by any suitable source and which is preferably a signal of approximately two hundred cps. and which swings between minus twenty-four and minus thirty-four volts, is coupled to the anode terminal of diode 611. The anode terminal of diode 612 is connected to the collector electrode of connector switch transistor 615. As previously explained, the unprimed connector switch transistor 616 is normally conductive so that the collector of transistor 615 and the anode terminal of diode 612 stand at minus forty volt potential at this time. The anode terminal of diode 613 is connected to the collector of normally non-conductive register transfer transistor 1106 and thus stands at minus forty volts at this time. The anode terminal of diode 614 is connected to conductor FSW1, which drops from minus twenty-four volts to minus forty volts when the switch-through circuit in the line finder portion of link 1 operates, as previously described. Before switch through of the line finder, the minus twenty-four volt potential appearing on conductor FSW1 effectively blocks the gate and the output signal from the gate remains at minus twenty-four volts. However, when the potential on conductor FSW1 drops to minus forty volts, the gate is enabled and its output signal follows the dial tone signal. The dial tone signal is coupled through diode 617 to the base of tone gate amplifier transistor 618 and the resulting amplified signal is coupled through capacitor 619 and resistor 620 to conductor LSW and thus to the calling line.

The subscriber at the calling station now dials the directory number of the desired called line. As described in the description of the finder matrix 13, the potential of conductor LSW drops from minus eighteen volts to minus twenty-four volts during each impulse of the tens and units digits and each minus twenty-four volt pulse renders transistor 602 conductive. The output signal from transistor 603 rises to minus eighteen volts during each impulse to render transistor 605 non-conductive. The output signal from transistor 605 drops to minus thirty-four volts, as determined by conduction through clamping diode 621, during each impulse, and these impulses are repeated as positive-going minus twenty-four volt pulses by digit amplifier inverter transistor 608. The first negative-going impulse at the collector of transistor 605 serves to render off-normal transistor 1108 conductive through capacitor 1109 and diode 1110. The resulting positive potential swing at the collector of transistor 1108, of course, renders the other transistor, namely, transistor 1111, of the off-normal flip-flop circuit non-conductive. When off-normal transistor 1108 is rendered conductive and its collector potential rises to minus twenty-four volts, diode 1107 is poled in the reverse direction and diode 609 is then utilized to control the operation of the interdigit timing circuit. During the remaining portion of the first pulse, the minus thirty-four volt potential at the collector of transistor 605 is coupled through diode 609 to maintain transistor 610 non-conductive, but at the termination of the first pulse when the potential at the collector of transistor 605 returns to minus twenty-four volts, transistor 610 is rendered conductive. The operation of the interdigit timing circuit will be described more fully hereinafter.

The positive-going minus twenty-four volt dial impulses appearing at the collector electrode of transistor 608 are coupled to the anode terminals of diodes 622 and 623, which each form one input to the units and tens gates UG and TG, respectively. The units gate UG, which comprises diodes 622, 624 and 625, is blocked at this time since the anode terminal of diode 625 is returned to the minus twenty-four volt potential appearing at the collector electrode of conducting register transfer transistor 1105. The tens gate, which comprises transistors 623, 626 and 627, is enabled to pass the positive-going minus twenty-four volt pulses at this time since the anode terminal of diode 626 is returned to the approximately minus forty volt potential at the collector electrode of non-conducting transistor 615 in the connector switch flip-flop circuit and the anode terminal of diode 627 is returned to the approximately minus forty volt potential at the collector electrode of non-conducting transistor 1106 in the register transfer flip-flop circuit. Each minus twenty-four volt dial pulse coupled through the tens gate TG and through capacitor 701 and resistor 702 to the base of tens amplifier transistor 703 serves to render transistor 703 non-conductive. The output signal appearing across load resistor 704 in the collector circuit of transistor 703 is coupled to the input of the tens register A stage.

If it be assumed that the tens digit of the called line number is the digit "3", three negative-going minus forty-eight volt pulses appear across resistor 704 in rapid succession. The positive-going trailing edge of the first pulse is coupled through steering diode 705 to the base of A transistor 706 and serves to render transistor 706 non-conductive and A′ transistor 707 conductive, in the same manner as fully explained in the description of the line finder registers. The second pulse renders transistor 707 non-conductive, transistor 706 becomes conductive, B transistor 801 is rendered non-conductive, and B′ transistor 802 becomes conductive. The third pulse again renders transistor 706 non-conductive and transistor 707 becomes conductive. Thus, at the completion of the tens digit, transistors 707, 802 and 803 are conductive and minus twenty-four volt potential is applied to conductors A′, B′, and C. Under these conditions, tens three amplifier transistor 804 is rendered conductive and minus twenty-four volt potential is applied to connector tens three conductor CT3, which extends to the connector matrix.

Returning to the consideration of the interdigit timing circuit, it will be remembered that off-normal transistor 1108 is rendered conductive by the first negative-going pulse appearing at the output of transistor 605 and that transistor 1111 of the off-normal flip-flop circuit becomes non-conductive. Prior to this operation, interdigit timing transistor 610 is held non-conductive from the minus forty volt potential at the collector of non-conductive transistor 1108 through diode 1107. With transistor 610 non-conductive, diode 628, which is connected between the collector of transistor 610 and point B, is poled in the forward direction charging the timing capacitor 629 to ground potential. Point C is connected through resistor 1112 to the collector of off-normal transistor 1111, which stands at minus twenty-four volts since transistor 1111 is conductive at this time. Thus, capacitor 631, which is connected to point C, is charged to approximately minus twenty volts as determined by the voltage division across resistors 1112 and 630. Since the base of register transfer drive transistor 1113 is returned through cross-coupling resistor 1114 to the collector of transistor 1115, which stands at minus twenty-four volts, diode 632, between points C and D, is poled in the forward direction holding the base of transistor 1113 at minus twenty volts. This voltage holds transistor 1113 non-conductive and also poles diode 633, which is connected between point B and the base of transistor 1113, in the reverse direction, thereby disconnecting point B from the base of transistor 1113.

When off-normal transistor 1111 becomes non-conductive upon receipt of the first dial impulse, its collector drops to minus forty volts so that timing capacitor 631 at point C starts to discharge toward approximately minus thirty-six volts, as determined by the voltage division across resistors 630 and 1112. When point C reaches minus twenty-two volts, diode 632 is poled in the reverse direction so that point C is disconnected from the base of transistor 1113. However, transistor 1113 will remain non-conductive because of the cross-coupling to the collector of transistor 1115 through resistor 1114. As previously explained, interdigit timing transistor 610 is rendered conductive during the make period following the first break interruption of the first digit and its collector potential drops to minus thirty-four volts. Since timing capacitor 629 is charged to ground and the base of transistor 1113 is held at minus twenty-two volts, diode 633, as well as diode 628, are poled in the reverse direction. Timing capacitor 629 now starts to discharge toward minus forty-eight volts through resistor 634. If another break follows the first make of the first digit, the collector of transistor 605 will again drop to minus thirty-four volts causing transistor 610 to become non-conductive. Thus, timing capacitor 629 will again charge to ground potential through collector load resistor 635 and diode 628. The time constant of this circuit is chosen so that the potential at point B will not affect the base of transistor 1113 until a make period of greater than one hundred and seventy-five milliseconds follows a break period.

Since it was assumed that the first digit dialed into the connector circuit was the digit "3", transistor 610 remains conductive for more than one hundred and seventy-five milliseconds only after it becomes conductive for the third time. After one hundred and seventy-five milliseconds, point B falls to minus twenty-two volts so that diode 633 is poled in the forward direction. The time constant of this circuit is altered when diode 633 becomes conductive because of the additional resistance now in parallel with resistor 634. Capacitor 629 continues charging toward minus forty-eight volts with this new time constant until it reaches minus twenty-four volts. At this point, transistor 1113 starts to conduct and its collector potential rises toward minus twenty-four volts and transistor 1115 starts toward non-conduction. When transistor 1115 starts toward non-conduction, its collector potential becomes more negative forcing the base of transistor 1113 more negative than minus twenty-four volts. During this changeover period, diode 633 is again poled in the reverse direction to disconnect point B from the base of transistor 1113. This is done so that the register transfer drive flip-flop circuit can complete its changeover rapidly without the by-pass effect of capacitor 629 connected to the base of transistor 1113. When capacitor 629 discharges to the base voltage of transistor 1113 in its conductive condition, diode 633 is again poled in the forward direction to connect point B to the base of transistor 1113. However, this occurs after the complete changeover of the register transfer drive flip-flop circuit.

When transistor 1113 becomes conductive, the resulting positive potential swing at its collector is coupled through capacitor 1116 and steering diode 1117 and serves to render register transfer transistor 1105 non-conductive. The resulting negative potential swing at the collector of transistor 1105, of course, renders transistor 1106 conductive. The register transfer flip-flop circuit serves to control the blocking of the tens register gate and the dial tone gate and the enablement of the units gate, as will be explained more fully hereinafter. When transistor 1115 of the register transfer drive flip-flop circuit becomes non-conductive, the negative potential swing at its collector is coupled through capacitor 1118, resistor 1119, and diode 1120 to the base of off-normal transistor 1111 for the purpose of rendering transistor 1111 conductive, transistor 1108 non-conductive, and thus resetting the off-normal flip-flop circuit. When transistor 1111 becomes conductive and its collector potential rises to minus twenty-four volts, timing capacitor 631 charges toward approximately minus twenty volts through resistors 1112 and 630. When point C reaches minus twenty-four volts, diode 632 is again poled in the forward direction. This connects the base of transistor 1113 to point C and raises the base of transistor 1113 more positive than the minus twenty-four volt potential of its emitter. Transistor 1113 thus starts toward non-conduction and transistor 1115 starts to conduct. When transistor 1115 starts to conduct, its collector potential becomes more positive and diode 632 is poled in the reverse direction. This disconnects point C and the base of transistor 1113 so that the changeover time of the register transfer drive flip-flop circuit is not slowed down by having capacitor 631 connected to the base of transistor 1113. When point C reaches minus twenty-two volts, diode 632 again conducts and eventually poles the base of transistor 1113 to minus twenty volts. Also, when off-normal transistor 1108 becomes non-conductive, the minus forty volt potential appearing at its collector electrode is coupled through diode 1107 to maintain interdigit timing transistor 610 non-conductive. Thus, the interdigit timing circuit, the off-normal flip-flop circuit, and the register transfer drive flip-flop circuit are reset to their initial conditions and the fact that the first digit has been registered is marked by the fact that the register transfer flip-flop circuit has been controlled to the condition wherein transistor 1106 is conductive and transistor 1105 is non-conductive.

The tens gate TG is now blocked by the minus twenty-four volt potential appearing at the collector of transistor 1106 and coupled to the anode terminal of diode 627. The units gate is now unblocked in readiness to couple the dial impulses of the second digit to the units register. The collector of transistor 608, which is coupled to diode 622 of the units gate, stands at minus forty-eight volts during the interdigit time and diode 624 is coupled to the collector of connector switch transistor 615 which stands at minus forty volts. Now, when register transfer transistor 1105 becomes non-conductive, its collector potential, which is coupled to the anode terminal of diode 625 of the units gate, drops to minus forty volts, the output of the units gate drops to minus forty volts, and units amplifier transistor 708 is rendered conductive. It will be recalled that the units register was reset to the condition wherein all of the primed stages are conductive. When units amplifier transistor 708 is rendered conductive, the positive-going potential swing at its collector is coupled through capacitor 805 and steering diode 806 to the base of A′ transistor 807 to render transistor 807 non-conductive. A transistor 808 becomes conductive, B′ transistor 809 is rendered non-conductive when transistor 808 becomes conductive, and transistor 810 becomes conductive when transistor 809 is rendered non-conductive. The units register is thus reset to zero and is ready to receive dial impulses of the units digit.

As previously described, the collector electrode of transistor 608 rises to minus twenty-four volt potential during each impulse of the received digit. Units output amplifier transistor 708 is rendered non-conductive by each positive pulse coupled through the units gate and the trailing edge of the negative pulse appearing at the collector of transistor 708 is utilized to advance the units register. If it be assumed that the second digit of the directory number of the called line is the digit "1," the units register assumes a setting wherein transistors 807 and 810 are conductive and minus twenty-four volt potential is applied to conductors A′ and B. Under these conditions, units one amplifier transistor 811 is rendered conductive and approximately minus four volt potential, as determined by the voltage division across load resistor 709 in the collector circuit of non-conducting connector switch-through transistor 710 and load resistor 812 in the collector circuit of conducting transistor 811, is applied to the connector units one conductor CU1. It will be recalled that minus twenty-four volt potential was applied to connector tens three conductor CT3 by tens three amplifier transistor 804 at the completion of the first digit. The voltage applied to conductor CU1 is of such value that the cross-point transistor corresponding to line circuit 31 in the connector matrix 15 is not rendered conductive at this time.

The first negative-going pulse occurring at the collector of dial pulse output amplifier transistor 605 serves to trigger the off-normal flip-flop circuit and the succeeding positive swing at the collector of transistor 605 renders interdigit timing transistor 610 conductive. The interdigit timing circuit functions in the exact same manner as described for the tens digit. At the completion of the one hundred and seventy-five millisecond interdigit timing interval, register transfer drive flip-flop circuit transistor 1113 is rendered conductive to transfer the operation of the register transfer flip-flop circuit to the condition wherein transistor 1105 is again conductive. The off-normal flip-flop circuit, the interdigit timing circuit, and the register transfer drive flip-flop circuit are then reset to their normal operated condition, as previously described. Thus, the completion of the second or units digit is marked by the register transfer flip-flop circuit wherein transistor 1105 is conductive and transistor 1106 is non-conductive.

The negative-going potential swing at the collector of register transfer transistor 1106 is coupled through diode 636 and capacitor 637 to the base of connector switch transistor 615 and renders transistor 615 conductive and transistor 616 non-conductive. The potential at the collector of transistor 1106 is also applied to the anode of diode 613 in gate DT6 to block said gate and thus remove dial tone from the line. When the potential at the collector of transistor 615 rises to minus twenty-four volts, the dial tone gate is further blocked by the minus twenty-four volt potential applied to the anode of diode 612 so that the gate remains blocked after the register transfer flip-flop circuit operates at the end of the second digit. The units gate and the tens gate are blocked by the minus twenty-four volt potential applied to the anode terminals of diodes 624 and 626, respectively. The minus twenty-four volt potential appearing at the collector of transistor 615 is also applied to the cathode terminal of diode 711 which, with diode 712, forms an "and" gate for positive signals. The cathode terminal of diode 712 is connected to the collector electrode of busy switch transistor 713. Since the collector of transistor 713 stands at minus twenty-four volts at this time, the output of the last-mentioned gate rises to minus twenty-four volts and connector switch-through transistor 710 is rendered conductive, solid minus twenty-four volt potential is applied to the emitter of units one amplifier transistor 811, the potential on connector units one conductor CU1 drops to minus twenty-four volts, and the cross-point transistor corresponding to line circuit 31 in connector matrix 13 is rendered conductive.

A busy test is now made of the selected called line circuit. It will be recalled that when the cross-point transistor in connector matrix 15 is rendered conductive, minus eighteen volt potential appears on conductor LSW' from matrix 15 if the line corresponding to that transistor is busy, and that minus twenty-four volt potential appears on conductor LSW' if the line is idle. First, assume that the selected called line is busy. The busy condition of the called line is registered by the busy switch flip-flop circuit, comprising transistors 713 and 714, which is controlled by the busy gate BG. It can be seen that the busy gate comprises diodes 638–642, inclusive, and is connected in an "and" gate for negative signals configuration. The anode terminal of diode 638 is connected to the collector electrode of idle switch transistor 716, which stands at approximately minus forty volts. The anode terminal of diode 639 is connected to the collector electrode of busy test delay transistor 717. Transistors 717 and 718 form a monostable circuit which is utilized to generate a false busy signal for a short period of time to cover any delay in the signal applied to conductor LSW' introduced by retard coil 643, and to allow the idle switch flip-flop circuit sufficient time to operate, as will be explained more fully hereinafter. Transistor 718 is normally held conductive by the bias applied to its base electrode through resistor 719 and transistor 717 is held non-conductive by the minus twenty-four volt potential appearing at the collector of transistor 718. When the connector switch flip-flop circuit operates at the completion of the units digit, the negative swing at the collector of transistor 616 is differentiated by capacitor 720 and resistor 721 and the resulting negative spike is utilized to render transistor 717 conductive. The resulting positive potential swing at the collector of transistor 717 is coupled to the anode terminal of diode 639 of the busy gate to block that gate for a short period of time and is also coupled through capacitor 722 to the base of transistor 718 to render transistor 718 non-conductive. Transistor 717 remains conductive only for the period of time required for capacitor 722 to discharge through resistor 719 to a point where the base of transistor 718 becomes negative with respect to its emitter. At that time, the circuit reverts to its normal condition and minus thirty-four volt potential is applied to the anode terminal of diode 639. The anode terminal of diode 640 of the busy gate is connected to the collector electrode of connector switch transistor 616, which stands at approximately minus forty volts at this time. The anode terminal of diode 641 is connected to conductor RDP' which, as previously explained, carries recurring pulses which swing between minus thirty-four and minus twenty-four volt potential. The anode terminal of diode 642 is connected through resistor 644 to the collector of busy test amplifier transistor 645. Since it was assumed that the called line is busy, transistor 645 is non-conductive and its collector potential stands at approximately minus thirty-four volts, as determined by the voltage division across resistors 646, 727 and 728. It can be seen that all inputs of gate BG are more negative than minus thirty-four volts except for the minus twenty-four volt false busy pulse applied to the anode terminal of diode 639. At the completion of the false busy pulse, a negative-going minus thirty-four volt output signal is realized from gate BG. The next minus twenty-four volt positive-going pulse appearing on conductor RDP' is coupled through gate BG, through capacitor 729, and through diode 730 to the base of busy switch flip-flop circuit transistor 713 to render transistor 713 non-conductive and transistor 714 conductive. The resulting minus twenty-four volt potential appearing at the collector of transistor 714 is coupled to the anode terminal of diode 723 of the idle gate to permanently block that gate even though the selected called line should become idle after testing busy. The resulting minus forty volt potential appearing at the collector of transistor 713 is coupled through diode 712 to render connector switch-through transistor 710 non-conductive and thus render non-conductive the cross-point transistor corresponding to the selected line in connector matrix 15. The cross-point transistor is made non-conductive so that if the selected line should go on-hook and then initiate another call, a line finder is not prevented from seizing the line. In other words, if this were not done, the finder in gate of the line would remain blocked until the party to the present call released. Minus forty volt potential is also applied to the anode terminal of diode 647 in the busy tone gate to unblock that gate. Busy tone, which may be generated by any suitable source and which is preferably of two hundred cps. interrupted at sixty IPM and which swings between minus thirty-four and minus twenty-four volts, is coupled through diode 648 and diode 649 to tone gate amplifier transistor 618, and the resulting amplified signal is applied to conductor LSW and thus to the calling line.

If it be assumed that the selected called line is idle, the minus twenty-four volt potential appearing on conductor LSW' serves to render busy test amplifier transistor 645 conductive, and the resulting minus eighteen volt potential appearing at its collector electrode blocks the busy gate and renders normally conducting idle test amplifier transistor 731 non-conductive. The resulting minus forty-eight volt potential appearing at the collector electrode of transistor 731 is applied to the anode terminal of diode 725 of the idle gate. The anode terminal of diode 723 is connected to the collector of busy switch transistor 714 and since transistor 714 is non-conductive, stands at approximately minus forty volts. The minus forty volt potential appearing at the collector of connector switch transistor 616 is applied to the anode terminal of diode 724. The next occurring minus twenty-four volt pulse on conductor RDP' is thus coupled through diode 726, capacitor 732, and diode 733 to render idle switch transistor 715 non-conductive and transistor 716 conductive. The resulting minus twenty-four volt signal appearing at the collector of transistor 716 is coupled to the anode terminal of diode 638 of the busy gate to block that gate and is also coupled through resistor 650 to render make busy amplifier transistor 651 conductive. The resulting minus twenty-four volt potential appearing at the collector of transistor 651 is applied to conductor LSWC for the purpose of rendering the link switch 14 bilateral transistor conductive and thus complete the conversational connection between the calling and called lines. It will be recalled that ringing is applied to the called line in the called line circuit and that ring-back tone is coupled back through the operated link switch and finder matrix switch to the calling line.

It will be recalled that minus eighteen volt potential is applied through the secondary windings of both the calling and called line circuit repeat coils to conductor LSW until such time as both parties to the connection hang up. At that time, the potential of conductor LSW drops to minus twenty-four volts and dial pulse input amplifier 602 is rendered conductive. It will be recalled that digit amplifier inverter transistor 608 is normally non-conductive and is rendered conductive only when transistor 602 becomes conductive. The minus forty-eight volt signal normally appearing at the collector of transistor 608 is coupled to the base of release timing amplifier transistor 1101 to hold transistor 1101 non-conductive. With transistor 1101 non-conductive, transistor 1102 is held non-conductive, the output signal from emitter-follower transistor 1103 is more negative than minus twenty-four volts, and reset output amplifier transistor 1104 is held conductive to apply minus twenty-four volt potential to conductor RS. It will be noted that while transistor 1101 is non-conductive, timing capacitor 1126 is charged to ground potential through diode 1127 and diode 1128 is poled in the reverse direction.

When transistor 1101 becomes conductive and its collector potential drops to minus thirty-four volts, diode 1127 is poled in the reverse direction and capacitor 1126 begins to discharge through resistor 1129 toward minus forty-eight volts. When the charge on capacitor 1126 reaches a point slightly below minus twenty-four volts, diode 1128 is poled in the forward direction and reset control amplifier transistor 1102 is rendered conductive. The time constant of the timing circuit is equal to approximately two hunderd and fifty milliseconds so that transistor 1102 will become conductive only when both parties release and not when transistor 1101 becomes conductive during each dial impulse. When transistor 1102 is rendered conductive, the output signal from emitter-follower transistor 1103 is positive with respect to minus twenty-four volts and reset output amplifier transistor 1104 is rendered non-conductive so that the potential of conductor RS drops to minus forty-eight volts.

When the potential of conductor RS drops to minus forty-eight volts, all conductive primed stages in the finder and connector flip-flop and tens register stages and the unprimed stages in the connector units register are rendered non-conductive. When the connector tens and units register are reset, minus twenty-four volt potential is removed from conductors CT3 and CU1 and the cross-point transistor corresponding to the called line circuit 31 in connector matrix 15 is made non-conductive. Similarly, when the finder tens register is reset, minus twenty-four volt potential is removed from conductor FT1 and the cross-point transistor corresponding to calling line circuit 11 in finder matrix 13 is made non-conductive. Thus, the potential of conductor LSW returns to minus 16.4 volts, transistors 602, 608 and 1101 become non-conductive, and reset output amplifier transistor 1104 becomes conductive to re-apply minus twenty-four volt potential to conductor RS. The line finder and connector circuit are now completely released and are in readiness to receive another call.

As used in this circuit, all NPN transistors may be type GT-692 and all PNP transistors except transistor 1104 may be type 2N44. Transistor 1104 may be type 2N143.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a telephone system, a plurality of line circuits, a line finder, means for controlling said line finder to search for a calling line circuit, said line finder being controlled to select each of said line circuits in turn, means in each line circuit operative only when that line circuit is in a calling condition and responsive to the selection of that line circuit by said line finder for transmitting a control signal to said line finder, switch-through means in said line finder operative in response to the receipt of said control signal, and means responsive to the operation of said switch-through means for terminating the searching operation of said line finder.

2. In a telephone system, a plurality of line circuits, a connecting circuit for selectively associating any one of said line circuits with a given circuit, said connecting circuit comprising a plurality of operable switches interposed in individual connections between said line circuits and said given circuit, a plurality of control conductors, means for individually connecting each of said line circuits to one of said control conductors, a line finder, means for controlling said line finder to search for a calling line circuit by applying a potential to each of said conductors in turn, means in each line circuit operative only when that line circuit is in a calling condition and responsive to the application of said potential to its associated conductor for transmitting a control signal to said line finder, switch-through means in said line finder operative in response to the receipt of said control signal, means responsive to the operation of said switch-through means for terminating the searching operation of said line finder, and means responsive to the operation of said switch-through means for operating the switch in said connecting circuit corresponding to the calling line circuit.

3. In a telephone system, a plurality of line circuits, a connecting circuit for selectively associating any one of said line circuits with a given circuit, said connecting circuit comprising a plurality of operable switches interposed in individual connections between said line circuits and said given circuit, a plurality of control conductors fewer in number than said line circuits, means for connecting each of said line circuits to two of said conductors in a combination unique thereto, a line finder, means for controlling said line finder to search for a calling line circuit by applying potential to said unique combinations of conductors in turn, means in each line circuit operative only when that line circuit is in a calling condition and responsive to the application of said potential to both of its associated conductors for transmitting a control signal to said line finder, switch-through means in said line finder operative in response to the receipt of said control signal, means responsive to the operation of said switch-through means for terminating the searching operation of said line finder, and means responsive to the operation of said switch-through means for operating the switch in said connecting circuit corresponding to the calling line circuit.

4. In a telephone system, a plurality of line circuits, a connecting circuit for selectively coupling any one of said line circuits to a given circuit, said connecting circuit comprising a plurality of semi-conductive devices, each of said devices having at least first and second electrodes and a control electrode, means for individually connecting ecah of said line circuits to the first electrode of one of said devices, means for connecting the second electrode of each device to said given circuit, a plurality of first control conductors, means for individually connecting each of said first conductors to the control electrode of one of said devices and to the line circuit which is connected to the first electrode of that device, a line finder, means for controlling said line finder to search for a calling line circuit by applying a first potential to each of said first conductors in turn, means in each line circuit operative only when that line circuit is in a calling condition and responsive to the receipt of said first potential over its associated first conductor for transmitting a control signal to said line finder, switch-through means in said line finder operative in response to the receipt of said control signal, means responsive to the operation of said switch-through means for terminating the searching operation of said line finder, a second conductor connected in multiple to the control electrodes of said devices, and means responsive to the operation of said switch-through means for applying a second potential to said second conductor to render conductive the one of said devices which has said first potential applied to its associated first conductor.

5. In a telephone system, a plurality of line circuits, a connecting circuit for selectively coupling any one of said line circuits to a given circuit, said connecting circuit comprising a plurality of semi-conductive devices each having at least first and second electrodes and a control electrode, means for individually connecting each of said line circuits to the first electrode of one of said devices, means for connecting the second electrode of each device to said given circuit, a plurality of first control conductors, means for connecting the control electrode of each device and the line circuit which is connected to the first electrode of that device to two of said first conductors in a combination unique thereto, a line finder, means for controlling said line finder to search for a calling line circuit by applying potential to said unique combinations of first conductors in turn, means in each line circuit operative only when that line circuit is in a calling condition and responsive to the application of said potential to both of its associated first conductors for transmitting a control signal to said line finder, switch-through means in said line finder operative in response to the receipt of said control signal, means responsive to the operation of said switch-through means for transmitting the searching operation of said line finder, a second control conductor connected in multiple to the control electrodes of said devices, and means responsive to the operation of said switch-through means for applying potential to said second conductor to render conductive the one of said devices which has potential applied to both of its associated first conductors.

6. A connecting circuit for selectively associating one of a group of lines with a given circuit, said connecting circuit comprising a plurality of semi-conductive devices each having at least first and second electrodes and a control electrode, means for individually connecting each of said lines to the first electrode of one of said devices, means for connecting the second electrode of each device to said given circuit, a plurality of first control conductors fewer in number than said devices, means for connecting the control electrode of each device to two of said first conductors in a combination unique thereto, a second control conductor connected in multiple to the control electrodes of said devices, means for selectively applying potential to two of said first conductors, and means thereafter effective for applying potential to said second conductor to render conductive the one of said devices having potential applied to both of its associated first conductors.

7. In a telephone system, a plurality of line circuits, a plurality of line finders, a line finder allotter for assigning said line finders for use in turn, means for controlling the assigned line finder to search for a calling line circuit, said assigned line finder being controlled to select each of said line circuits in turn, means in each line circuit operative only when that line circuit is in a calling condition and responsive to the selection of that line circuit by the assigned line finder for transmitting a control signal to said plurality of line finders, and means in the assigned line finder responsive to the receipt of said control signal for terminating the searching operation of that line finder.

8. In a telephone system, a plurality of line circuits, a plurality of line finders, a line finder allotter for assigning said line finders for use in turn, means for controlling the assigned line finder to search for a calling line circuit, means in the assigned line finder for transmitting a first control signal to each of said line circuits as said line circuits are selected in turn by said assigned line finder, means in each line circuit operative only when that line circuit is in a calling condition and responsive to the receipt of said first control signal for transmitting a second control signal to said plurality of line finders, and means in the assigned line finder responsive to the receipt of said second control signal for terminating the searching operation of the assigned line finder.

9. In a telephone system, a plurality of line circuits, a plurality of line finders, a line finder allotter for assigning said line finders for use in turn, means for controlling the assigned line finder to search for a calling line circuit, said assigned line finder being controlled to select each of said line circuits in turn, means in each line circuit operative only when that line circuit is in a calling condition and responsive to the selection of that line circuit by the assigned line finder for transmitting a control signal to said plurality of line finders, switch-through means in each of said line finders operative only when that line finder is assigned for use and operated in response to the receipt of said control signal, means responsive to the operation of said switch-through means in the assigned line finder for terminating the searching operation of the assigned line finder, and means also responsive to the operation of the switch-through means in the assigned line finder for controlling said allotter to assign another one of said line finders for use.

10. In a telephone system, a plurality of line circuits, a plurality of line finders, a line finder allotter for assigning said line finders for use in turn, means for controlling the assigned line finder to search for a calling line circuit, means in the assigned line finder for transmitting a first control signal to each of said line circuits as said line circuits are selected in turn by said assigned line finder, means in each line circuit operative only when that line circuit is in a calling condition and responsive to the receipt of said first control signal for transmitting a second control signal to said plurality of line finders, switch-through means in each of said line finders operative only when that line finder is assigned for use and operated in response to the receipt of said second control signal, means in the assigned line finder responsive to the operation of its switch-through means for terminating the searching operation of the assigned line finder, and means also responsive to the operation of the switch-through means in the assigned line finder for controlling said allotter to assign another one of said line finders for use.

11. In a telephone system, a plurality of line circuits, a connector circuit comprising a register for storing the number of a called line circuit, a plurality of semi-conductive devices interposed in individual connections between said line circuits and said connector for extending individual control paths from said line circuits to said connector when said devices are biased for conduction, a line finder, means for controlling said line finder to search for a calling line circuit, means in said line finder for transmitting a first control signal to each of said line circuits as said line circuits are selected in turn by said line finder, means in each line circuit operative only when that line circuit is in a calling condition and responsive to the receipt of said first control signal for transmitting a second control signal to said line finder, switch-through means in said line finder operative in response to the receipt of said second control signal, means responsive to the operation of said switch-through means for terminating the searching operation of said line finder, means also responsive to the operation of said switch-through means for biasing one of said devices for conduction to thereby connect said calling line circuit to said connector, means responsive to the transmission of impulses representing the number of a selected called line circuit by said calling line circuit for causing said register to store said number, and means thereafter effective for completing a conversational path from said calling line circuit through said one device to the selected called line circuit.

12. In a telephone system, a plurality of lines, a connector circuit comprising a register for storing the number of a called line, a plurality of semi-conductive devices interposed in individual connections between said lines and said connector for extending individual control paths from said lines to said connector when said devices are biased for conduction, means responsive to the initiation of a call on one of said lines for biasing one of said devices for conduction to thereby extend a control path from said one line to said connector through said one device, means responsive to the transmission of impulses representing the number of a selected called line over said one line for causing said register to store said number, and means thereafter effective for completing a conversational path from said one line through said one device to the selected called line.

13. In a telephone system, a plurality of lines, a plurality of line circuits each connected to one of said lines, a connector circuit, a conductor connected to said connector circuit, a plurality of bilateral semi-conductive devices each having at least first and second electrodes and a control electrode, means for individually connecting each of said line circuits to the first electrode of one of said devices, means for connecting said conductor in multiple to the second electrodes of said devices, means for normally biasing the control electrode of each of said devices to prevent conduction between its first and second electrodes, means responsive to the initiation of a call on one of said lines for biasing the control electrode of the device associated with said one line to permit conduction between its first and second electrodes, means in the line circuit associated with said one line responsive to dial impulses representing a called line received over said one line for repeating the dial impulses through its associated device to said conductor, means in said connector responsive to the receipt of said dial impulses over said conductor for registering the designation of the called line, and means thereafter effective for completing a conversational path from said one line through the line circuit and device associated with said one line to the called line.

14. In a telephone system, a plurality of lines, a connector circuit comprising a register for storing the number of a called line, first and second conductors connected to said connector, a first plurality of semi-conductive devices interposed in individual connections between said lines and said first conductor for individually coupling said lines to said first conductor when said devices are biased for conduction, a second plurality of semi-conductive devices interposed in individual connections between said lines and said second conductor for individually coupling said lines to said second conductor when said devices are biased for conduction, means responsive to the initiation of a call on one of said lines for biasing one of said first plurality of devices for conduction to thereby couple said one line to said first conductor, means responsive to the transmission of impulses representing the number of a selected called line over said one line for causing said register to store said number, means controlled in accordance with the number stored in said register for biasing one of said second plurality of devices for conduction to thereby couple the selected called line to said second conductor, and means controlled by said connector for connecting first conductor to said second conductor to thereby complete a conversational path from said one line to said called line.

15. In a telephone system, a plurality of lines, a connector circuit comprising a register for storing the number of a called line, first and second conductors connected to said connector, a first plurality of semi-conductive devices interposed in individual connections between said lines and said first conductor for individually coupling said lines to said first conductor when said devices are biased for conduction, a second plurality of semi-conductive devices interposed in individual connections between said lines and said second conductor for individually coupling said lines to said second conductor when said devices are biased for conduction, means responsive to the initiation of a call on one of said first plurality of devices for conduction to thereby couple said one line to said first conductor, means responsive to the transmission of impulses representing the number of a called line over said one line for causing said register to store said number, means controlled in accordance with the number stored in said register for biasing one of said second plurality of devices for conduction to thereby couple the called line to said second conductor, means in said connector for thereafter testing the busy condition of the called line over said second conductor, a source of busy tone, means in said connector operated in the event that said called line tests busy for connecting said source of busy tone to said first conductor, and means operated in the event that said called line tests idle for connecting said first conductor to said second conductor to thereby complete a conversational path from said one line to said called line.

References Cited in the file of this patent

UNITED STATES PATENTS

| | | |
|---|---|---|
| 1,294,285 | Lorimer et al. | Feb. 11, 1919 |
| 1,799,485 | Stehlik | Apr. 7, 1931 |
| 2,713,614 | Stehlik | July 19, 1955 |
| 2,761,905 | Lomax | Sept. 4, 1956 |